(12) United States Patent
Bergan

(10) Patent No.: US 7,065,516 B1
(45) Date of Patent: Jun. 20, 2006

(54) DATA CHECKER APPARATUS AND METHOD

(75) Inventor: John Richard Bergan, Tuscon, AZ (US)

(73) Assignee: Assessment Technology Inc, Tucson, AZ (US)

( * ) Notice: Subject to any disclaimer, the term of this patent is extended or adjusted under 35 U.S.C. 154(b) by 0 days.

(21) Appl. No.: 09/558,060

(22) Filed: Apr. 26, 2000

(51) Int. Cl.
*G06F 17/30* (2006.01)

(52) U.S. Cl. ............................................ 707/3; 707/10

(58) Field of Classification Search ............... 707/1, 707/2, 10, 203, 3; 434/530, 522, 322, 323, 434/350
See application file for complete search history.

(56) References Cited

U.S. PATENT DOCUMENTS

| | | | |
|---|---|---|---|
| 5,537,587 A | | 7/1996 | Kelley et al. |
| 5,730,604 A | * | 3/1998 | Jay et al. .................... 434/365 |
| 5,829,983 A | * | 11/1998 | Koyama et al. ............ 434/118 |
| 5,835,758 A | * | 11/1998 | Nochur et al. .............. 707/102 |
| 5,864,869 A | * | 1/1999 | Doak et al. .............. 707/104.1 |
| 5,893,717 A | * | 4/1999 | Kirsch et al. ............... 434/118 |
| 6,044,387 A | * | 3/2000 | Angiulo et al. ............. 707/533 |
| 6,149,441 A | * | 11/2000 | Pellegrino et al. .......... 434/350 |
| 6,202,060 B1 | * | 3/2001 | Tran ............................... 707/3 |
| 6,269,355 B1 | * | 7/2001 | Grimse et al. ................ 705/32 |
| 6,322,366 B1 | * | 11/2001 | Bergan et al. .............. 434/118 |
| 6,353,447 B1 | * | 3/2002 | Truluck et al. ............. 715/733 |
| 6,498,920 B1 | * | 12/2002 | Simon ......................... 434/350 |
| 6,535,713 B1 | * | 3/2003 | Houlihan et al. ........... 434/350 |
| 6,554,618 B1 | * | 4/2003 | Lockwood .................. 434/322 |
| 6,685,478 B1 | * | 2/2004 | Ho et al. ..................... 434/219 |
| 6,904,263 B1 | * | 6/2005 | Grudnitski et al. ......... 434/308 |
| 2003/0027121 A1 | * | 2/2003 | Grudnitski et al. ......... 434/308 |

OTHER PUBLICATIONS

Kelly et al. Qualitative observations from software code inspection experiments, IBM Centre for Advanced Studies Conference, 2002, p. 5.*

Villiers De Ruth. Usability evaluation of an e-learning totorial: criteria, questions and case study, ACM International Conference Proceeding Series; vol. 75, 2004, p. 284-291.*

Foley Jim. Integrating computer technology, people technology and application technology: strategies and studies from Georgia Tech's Graphic, Visualization and Usability Center,Proceeding of the workshop on Advanced visual interfaces, 1994, 34-43.*

* cited by examiner

*Primary Examiner*—Jean M. Corrielus
*Assistant Examiner*—Baoquoc N. To
(74) *Attorney, Agent, or Firm*—Donald W. Marks

(57) ABSTRACT

In a data checking system and method for an educational management system, lists of various possible areas for data entries are displayed for a user to select the areas for which data entry is necessary. Upon request, the user can request a check of a data base of the system to determine if data has been entered for selected areas.

10 Claims, 23 Drawing Sheets

FIG. 5 — CLASS INFORMATION (290)
- GLOBAL ID (234)
- CENTER (292)
- TEACHER FIRST NAME (294)
- TEACHER LAST NAME (296)
- CLASS HOURS (298)

FIG. 6 — CHILD INFORMATION (306)
- GLOBAL ID (234)
- CLASS NAME (308)
- CHILD FIRST NAME (310)
- CHILD LAST NAME (312)
- GENDER (314)
- BIRTH DATE (316)
- ETHNICITY (318)
- PRIMARY LANGUAGE (320)
- SOCIAL SECURITY NUMBER (322)
- NOTES (324)

FIG. 7 — FAMILY INFORMATION (330)
- GLOBAL ID (234)
- CHILD NAME (332)
- CLASS NAME (334)
- MEMBER FIRST NAME (336)
- MEMBER LAST NAME (338)
- GENDER (340)
- BIRTH DATE (342)
- STATUS (344)
- SOCIAL SECURITY NO. (346)
- RELATIONSHIP (348)
- OCCUPATION (350)
- EDUCATION (352)
- INCOME (354)
- STREET ADDRESS (356)
- CITY (358)
- STATE (360)
- ZIPCODE (362)
- PHONE DAYTIME (364)
- PHONE HOME (366)

FIG. 8 — ATTENDANCE (370)
- GLOBAL ID (234)
- CHILD NAME (372)
- CLASS NAME (374)
- DATE (376)
- ARRIVAL TIME (378)
- DEPARTURE TIME (380)
- ABSENCE (382)
- REASON FOR ABSENCE (384)

DATA CHECKER APPARATUS AND METHOD

CROSS-REFERENCE TO RELATED APPLICATIONS

The application is related to U.S. patent application Ser. No. 09/338,440 filed Jun. 23, 1999 by John Richard Bergan, John Robert Bergan and Kerrie L. Cole for Educational Management System and which is hereby incorporated by reference.

BACKGROUND OF THE INVENTION

In computerized management systems, such as is described in U.S. patent application Ser. No. 09/338,440 filed Jun. 23, 1999 by John Richard Bergan, John Robert Bergan and Kerrie L. Cole for Educational Management System, multiple users enter and maintain data files in a central data base. The effectiveness of the management system depends upon all the multiple parties using and entering the correct files and data. There exists a need for a simple and easy apparatus and method for determining if necessary files have been entered and whether certain data has been entered correctly. Additionally there exist differences between different agencies and between users in an agency on what files and/or data are necessary to maintain a desired degree of usefulness of the system.

BRIEF SUMMARY OF THE INVENTION

An object of the invention is to enable simple and easy checking of the presence and/or correctness of files and data in a database of a management system.

Another object of the invention is to allow a user to select one or more items from a list of items defining possible files and data in the database of a management system.

The invention is summarized in an apparatus and method for checking a database of a computerized management system for files and/or data necessary for the management system includes a procedure for allowing a user to select one or more areas or items from a list of areas or items defining possible files and data in the management system. In response to the user requesting a check of the data base, a procedure determines if the items in the selected area or the selected items are present in the data base.

BRIEF DESCRIPTION OF THE SEVERAL VIEW OF THE DRAWINGS

FIG. 5 is a diagrammatic illustration of a class information table stored and employed in the network of FIG. 1 for storing data relating to one or more classes within a center defined in the table of FIG. 4.

FIG. 6 is a diagrammatic illustration of a child information table stored and employed in the network of FIG. 1 for storing data relating to children enrolled in one or more classes defined in the table of FIG. 5.

FIG. 7 is a diagrammatic illustration of a family information table stored and employed in the network of FIG. 1 for storing data relating to family members of children listed in the table of FIG. 6.

FIG. 8 is a diagrammatic illustration of an attendance information table stored and employed in the network of FIG. 1 for storing data relating to attendance.

DETAILED DESCRIPTION OF THE INVENTION

Figure 1:
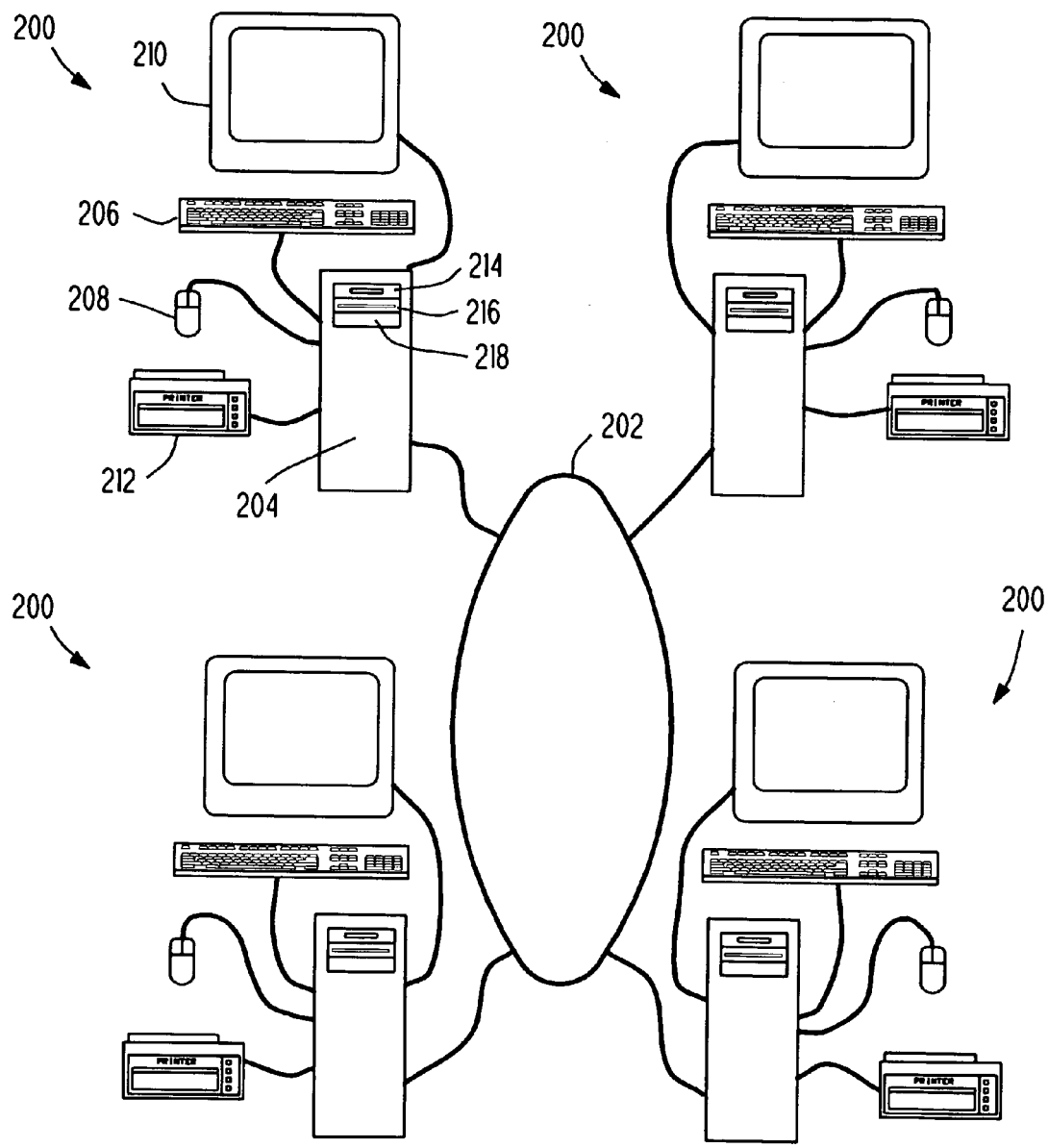
FIG. 1 is a diagram of one possible network of computers employed in an educational management system in accordance with one embodiment of the invention.

As shown in FIG. 1, one educational management system employing the data checking system in accordance with the invention includes a plurality of computer stations 200 which are interconnected by a network 202. Each computer station 200 typically includes a central unit 204 which is connected to a keyboard 206, mouse 208, display 210 and printer 212. The central unit 204 typically includes a read/write removable media device such as floppy disk drive 214, a read only removable media device such as a CD-ROM or DVD reader 216 and a mass storage device such as a hard drive 218. The educational management system can be operated on a single one of the computer stations 200 without any interconnection with other computer stations, but for educational management systems for multiple classes usefulness is enhanced by operating a system with a plurality of stations.

The network 202 is one of a variety of possible network configurations. Where the educational management system is employed in a single school or closely distanced schools, the network 202 can be a hardwired internal network or connected through dedicated lines. In the typical internal network system, one of the stations 200 is a server with the other stations accessing the server for data storage, programs and communications such as e-mail. Where the educational management system is employed in more distant class rooms, the network can be formed by dial up telephone lines, the internet, or some other digital communication system for data transfer and communications.

Figure 2:
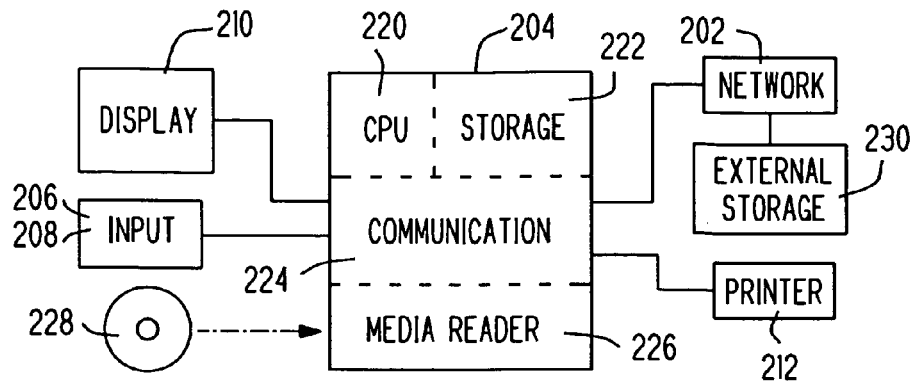
FIG. 2 is a block diagram of a typical computer station employed in the network illustrated in FIG. 1.
Figure 3:
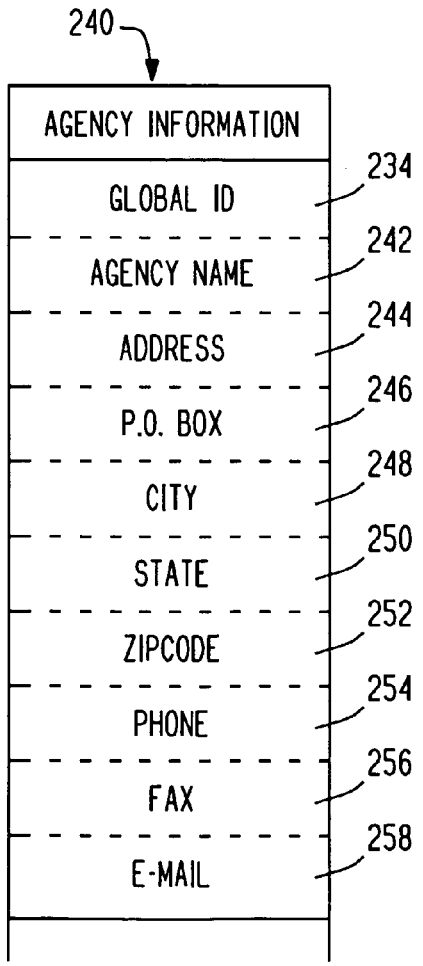
FIG. 3 is diagrammatic illustration of an agency information table stored and employed in the network of FIG. 1 for storing data relating to one or more agencies within the educational management system.
Figure 4:
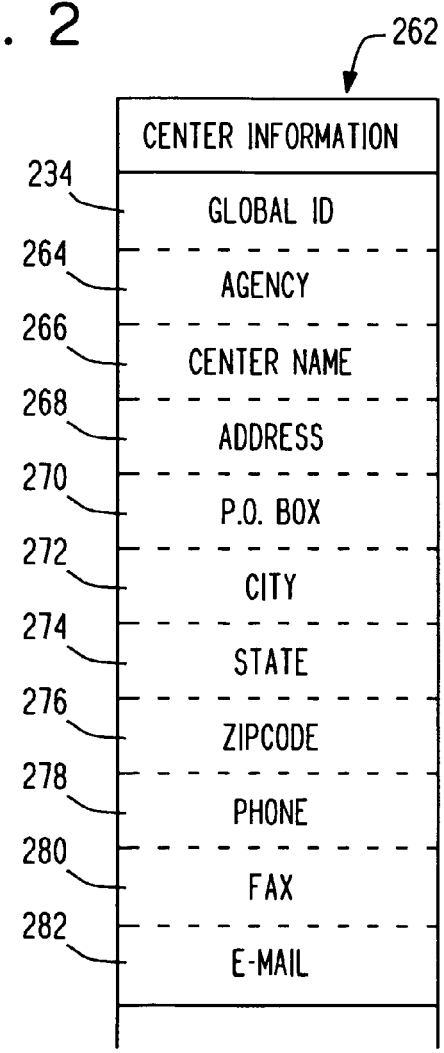
FIG. 4 is a diagrammatic illustration of a center information table stored and employed in the network of FIG. 1 for storing data relating to one or more centers within an agency defined in the table of FIG. 3.

As shown in FIG. 2, the typical unit 204 includes a central processor (CPU) 220, one or more internal storage or memory units 222, communication control units 224, and media reader 226. The CPU 220 is operated by instructions contained in various computer programs including operating systems and applications in the memory 222 and generally controls the operation of all systems and units in the unit 204. The storage control unit or units 222 also include the hard drive 218. The communication unit or units 224 handle various inputs and outputs such as inputs from the keyboard 206, mouse 208, network 202 and outputs to the display 210, the network 202 and the printer 212. The media reader 226 reads various media such as a CD-ROM disk 228. External storage 230 is accessed through the network 202.

Storage such as one or more of the hard drive 218, external storage 230 and/or removable media 228 contains a computer program and a database for operating the CPU in accordance with the education management system. Several files or portions of the database are shown in FIGS. 3–8 and additional files are illustrated, described or can be understood from related U.S. patent application Ser. No. 09/338,440 filed Jun. 23, 1999 by John Richard Bergan, John Robert Bergan and Kerrie L. Cole for Educational Management System. Each record in the database includes a unique global ID 234 which for example can be a variable of the type GUID generated by an algorithm that ensures no duplication. The use of a GUID (for example, a 39 byte string or value) to uniquely identify each record ensures that records can be moved from database to database at different locations without concern about duplicate IDs corrupting data. Additional ID numbers can be employed to identify children, classes, teachers, etc. An agency information table 240 shown in FIG. 3 contains one or more records (rows) with each record including the name of an agency 242, a street address 244 of the agency, a P.O. box number 246, a city 248, a state 250, a zipcode 252, a phone number 254, a fax number 256 and an e-mail address 258. A center information table 262 in FIG. 4 contains one or more records with each record including the agency 264 to which the center belongs, the name 266 of the center, a street address 268 of the center, a P.O. box number 270, a city 272, a state 274, a zipcode 276, a phone number 278, a fax number 280 and an e-mail address 282. A class information table 290 in FIG. 5 contains one or more records with each record including the center 292 in which the class is located, a teacher's first name 294, a teacher's last name 296 and class hours 298 (all day, morning, afternoon); the teacher's last and first name and the class hours identify the class. A child information table 306 in FIG. 6 contains a plurality of records with each record including the class name (or ID) 308 in which the child is enrolled, child's first name 310, child's last name 312, gender 314, birth date 316, ethnicity 318, primary language 320, social security number 322 and notes 324 entered by the child's teacher. A family information table in FIG. 7 contains a plurality of records with each record including the child's name (or ID) 332, the class name (or ID) 334, family member's first name 336, family member's last name 338, gender of family member 340, birth date of family member 342, status (primary care giver, other care giver, or family member) 344, social security number 346, relationship to child 348, occupation 350, education 352, income 354, street address 356, city 358, state 360, zipcode 362, daytime phone number 364, and home phone number 366. An attendance information file 370 shown in FIG. 8 contains records of attendance of children wherein each record including the child's name or ID 372, the class name or ID 374, a date 376 with arrival time 378 and departure time 380, and absence indication 382 with the reason for absence 384. Similar attendance information files for staff members and volunteers can be maintained.

It is necessary that the files and the data contained in the educational management system be entered and maintained on a daily or other periodic basis in order that managers can be apprized of operation of the educational system and can thus effectively manage the educational system. In order to assist in ensuring the maintenance of the files in the educational management system, a data checking program illustrated by the procedures and associated windows of FIGS. 9 through 43 is employed. One embodiment of the program was designed for use with computers employing WINDOWS95, WINDOWS98 or WINDOWSNT and the following description and associated drawings are directed to that embodiment, but the program can be readily modified or adapted to run on a variety of different computer systems to check data in many different types of computerized management systems.

Figure 9:
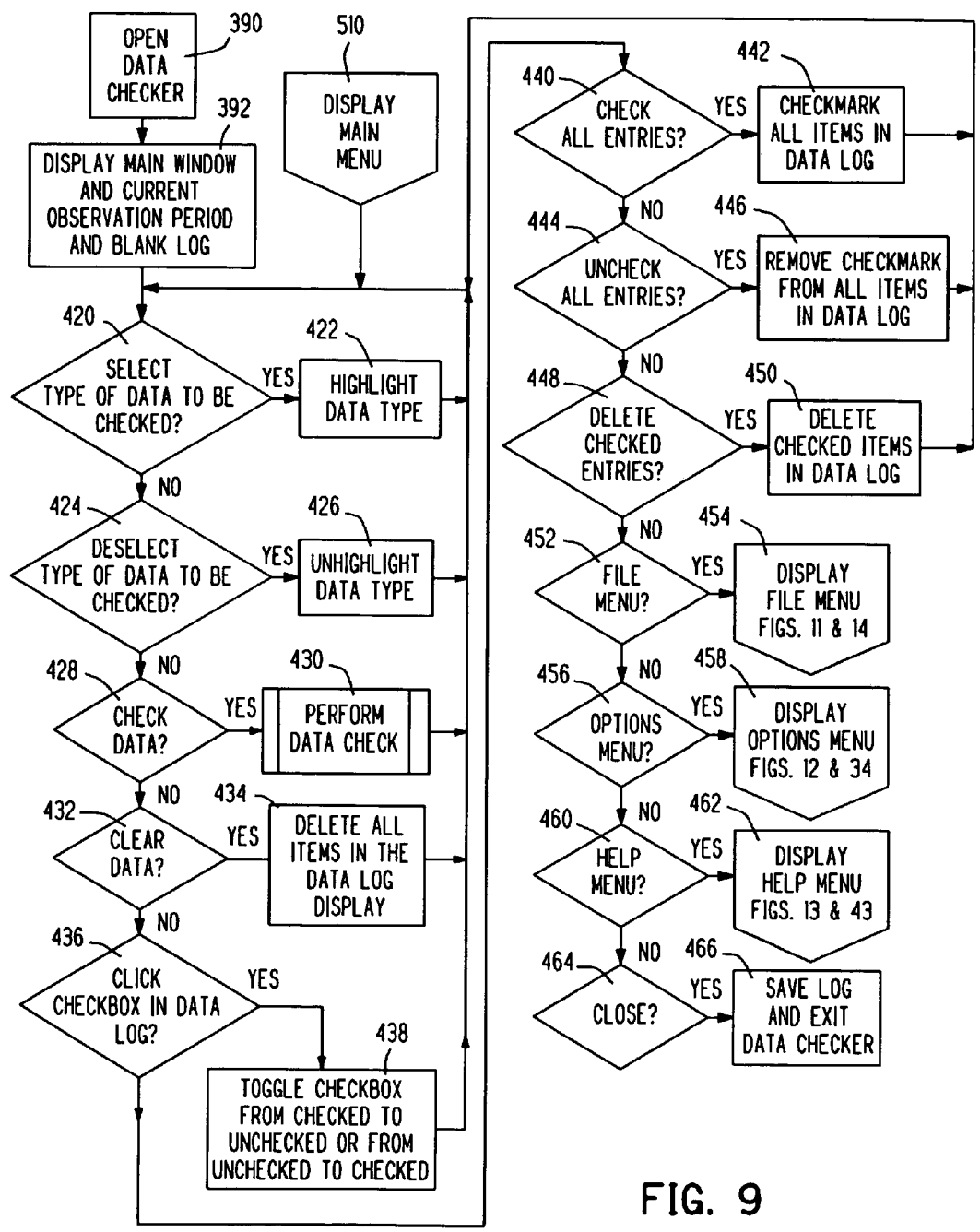
FIG. 9 is a flow diagram of main program procedure employed in the network of FIG. 1 for checking files and data stored in the network of FIG. 1.
Figure 10:
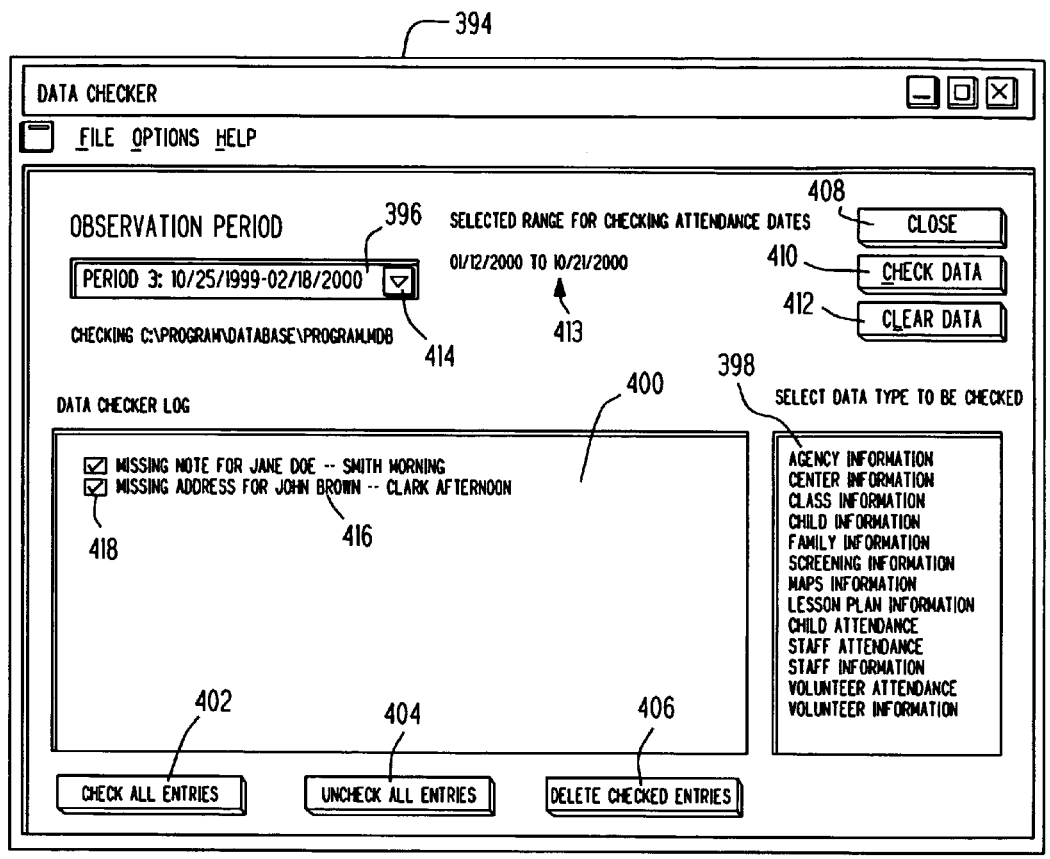
FIG. 10 is an illustration of a window displayed on a computer monitor during operation of the main procedure of FIG. 9.

In a main program starting at point 390 in FIG. 9, step 392 displays the main menu window 394 as shown in FIG. 10 on the monitor. The window 394 contains a menu bar with the items "file", "options" and "help", any one of which can be selected by being clicked with a mouse pointer or by pressing the key corresponding to the underlined character of the item while the "Alt" key is depressed. Additionally the window 394 contains an observation period selection box 396, a information type selection box 398, a data checker log box 400, a check all entries button 402, an uncheck all entries button 404, a delete checked items button 406, a close button 408, a check data button 410, a clear data button 412 and a display 413 of the selected range of dates for checking attendance. It is noted that hereinafter the verb "select", "click" or "double-click" is often used in one of its various forms to describe user input to call or request a desired function or to select a particular item or person. Such selection can often be made by any one of a variety of methods including clicking (moving a mouse arrow or pointer onto a displayed name, button, icon, or other item and pressing a mouse key), keyboard entry (pressing a key corresponding to an underlined letter in a name or title while an "Alt" or "Ctrl" key is depressed, pressing a function key designated for the function or item, or some other combination of keys), pressing the enter key to select a highlighted or otherwise emphasized item or function, or any other conventional manner. Often for brevity only one selection method, such as clicking, is described, but it is understood that selection of a particular item or procedure can often be made by any one of a plurality of methods and that description of selection by one method is meant to include selection by any other conventional selection method. Initially the observations selection box 396 displays the current observation period as the selected observation period but contains a button 414 for calling a display list of observation periods from which the desired observation period can be selected. The data type box 398 contains a list of possible types of files (based upon one of many possible classifications of the system files) which can be selected for checking. Upon performing a data check, data log box 400 lists the missing items 416 of the selected data type or types with check boxes 418 to enable the user to save or delete the checked items in the list.

At step 420 in FIG. 9, it is determined if one of the items in the data type box has been clicked and, if so, step 422 causes the selected item to be highlighted. Clicking on a highlighted item in the data type box is detected in step 424 to branch to step 426 where the highlighting of the clicked item is removed. When check data button 410 is selected, the program at step 428 proceeds to step 430 where checking for the presence of selected data or record items is performed. Any missing items 416 are displayed in the data log box 400 together with check boxes 418. Clicking on the clear data button 412 is sensed in step 432 to branch to step 434 where all data in the log box 400 is erased. Step 436 detects clicking on any check box 418 to toggle the box for unchecked to checked or from checked to unchecked in step 438. All check boxes in the data log list window 400 can be checked by clicking on button 402 which causes step 440 to branch to step 442 checkmark all items in the data log. Similarly clicking on button 404 results in steps 444 and 446 removing all checkmarks for the items in data log 400. Clicking on the delete checked entries button 406 is detected in step 448 to branch to step 450 where the checked items in the data log box 400 are deleted. Steps 452, 456 and 460 detect selection of a respective one of the menu items "file", "options" or "help" to branch to the corresponding step "display the file menu" 454, "display the options menu" 458 or "display the help menu" 462. When the close button 408 is selected, step 464 branches to step 466 where the checked log items are saved in a file and the data checker program is terminated.

Figure 11:
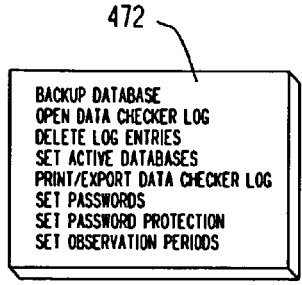
FIG. 11 is an illustration of a file pop-up menu displayed during the file procedure of FIG. 14.
Figure 14:
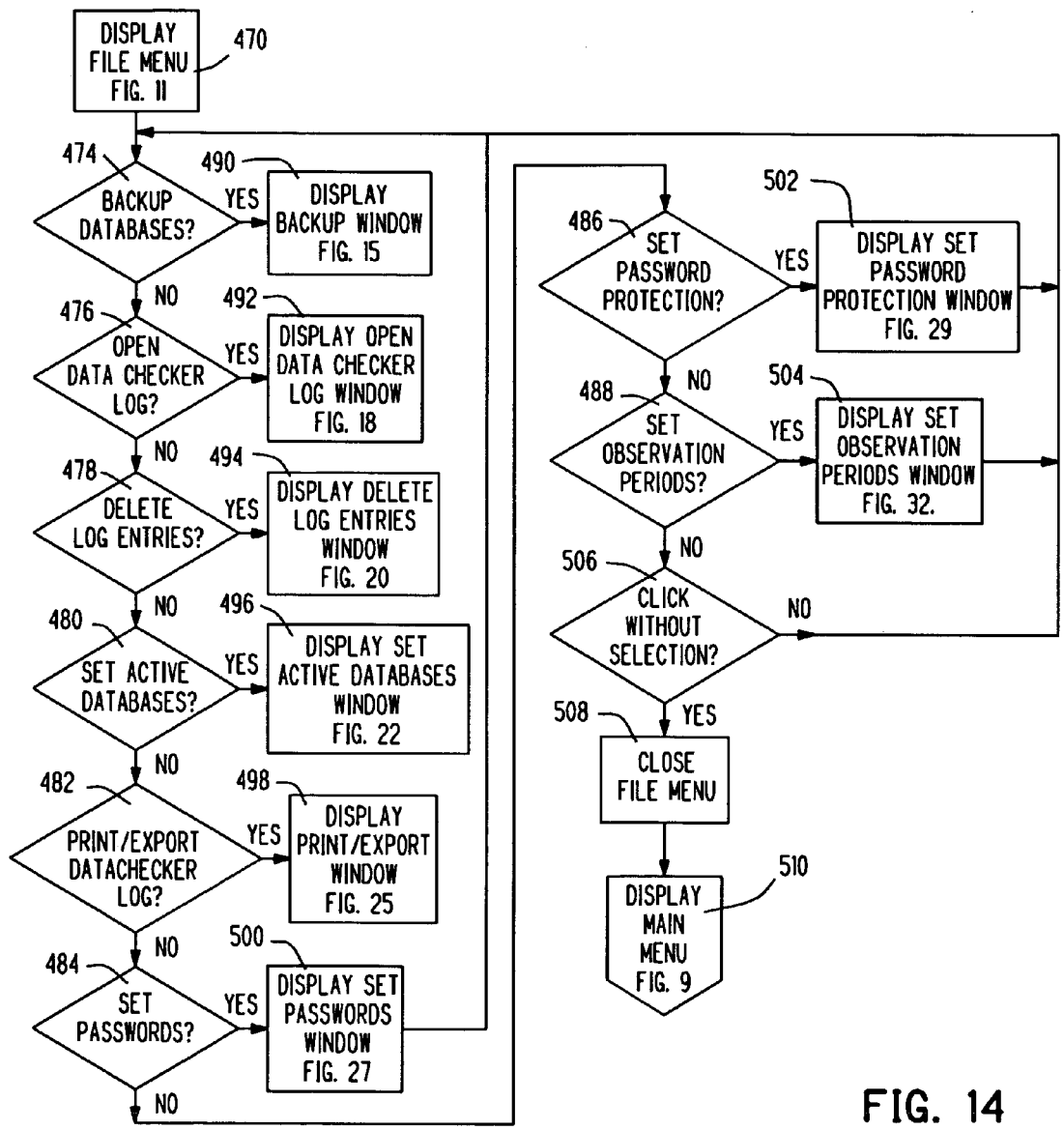
FIG. 14 is a flow diagram of a file procedure called by selection of item "file" from the menu bar in FIG. 10.

When step 454 calls the file menu procedure of FIG. 14, step 470 displays the file pop-up menu 472 of FIG. 11. This file pop-up menu 472 includes the menu items "backup database", "open data checker log", "delete log entries", "set active databases", "print/export data checker log", "set passwords", "set password protection" and "set observation periods". Selection of one these menu items is detected in the corresponding step 474, 476, 478, 480, 482, 484, 486 and 488 call the respective procedure "display the backup window" 490, "display the open data checker log window" 492, "display the delete log entries window" 494, "display the set active databases window" 496, "display the print/export window" 498, "display the set passwords window" 500, "display the set password protection window" 502 or "display the set observation periods window" 504. Clicking the mouse without selecting any item in the pop-up window 472 is detected in step 506 to proceed to step 508 where the pop-up menu 472 is erased and then return to step 510 of the main data checker program of FIG. 9.

Figure 15:
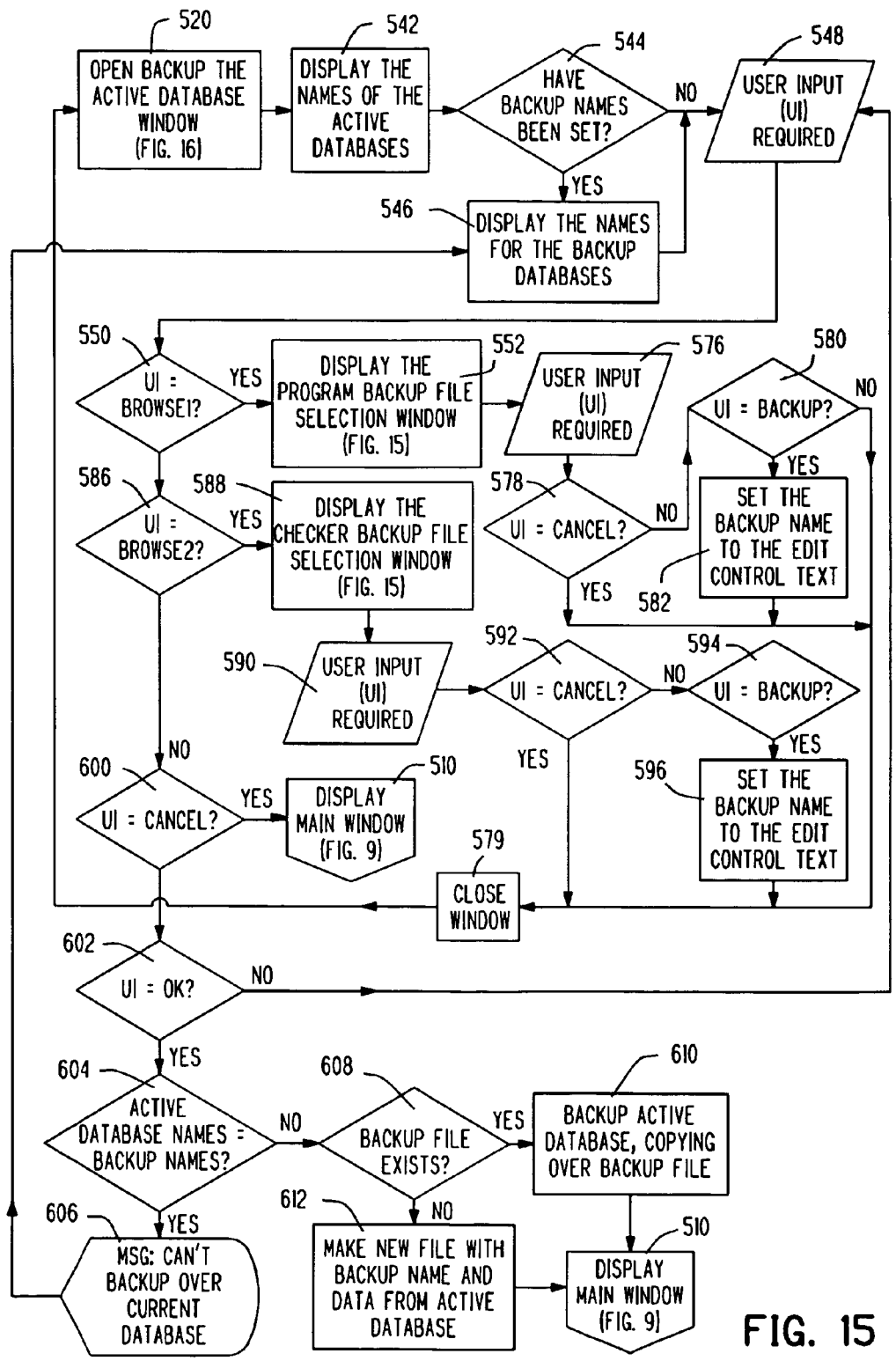
FIG. 15 is a flow diagram of a backup databases procedure in the data checking system program of FIG. 9.
Figure 16:
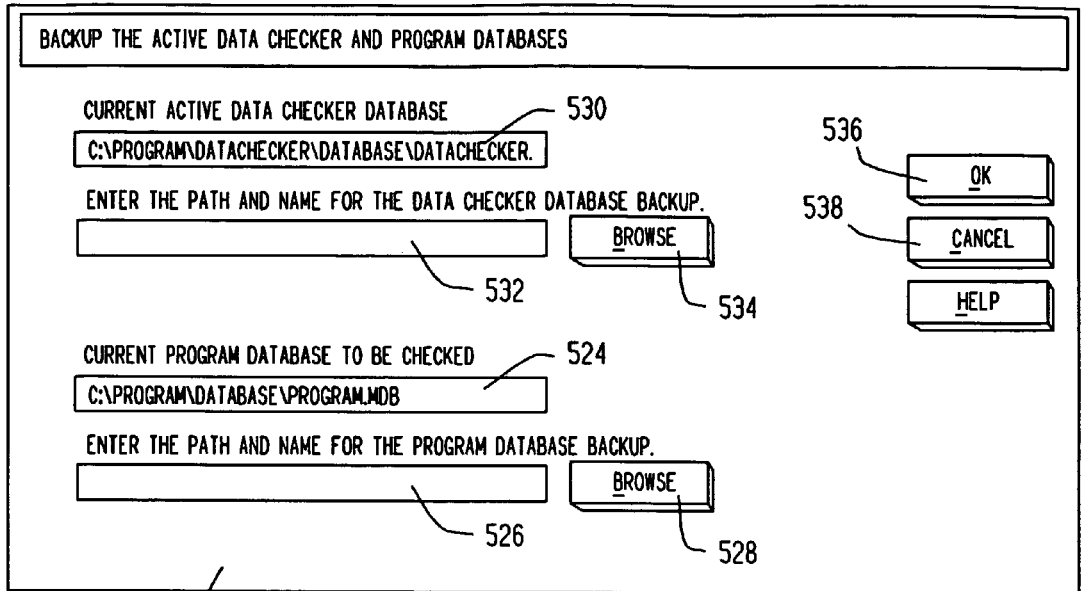
FIG. 16 is an illustration of a window displayed during the backup active database procedure of FIG. 15.
Figure 17:
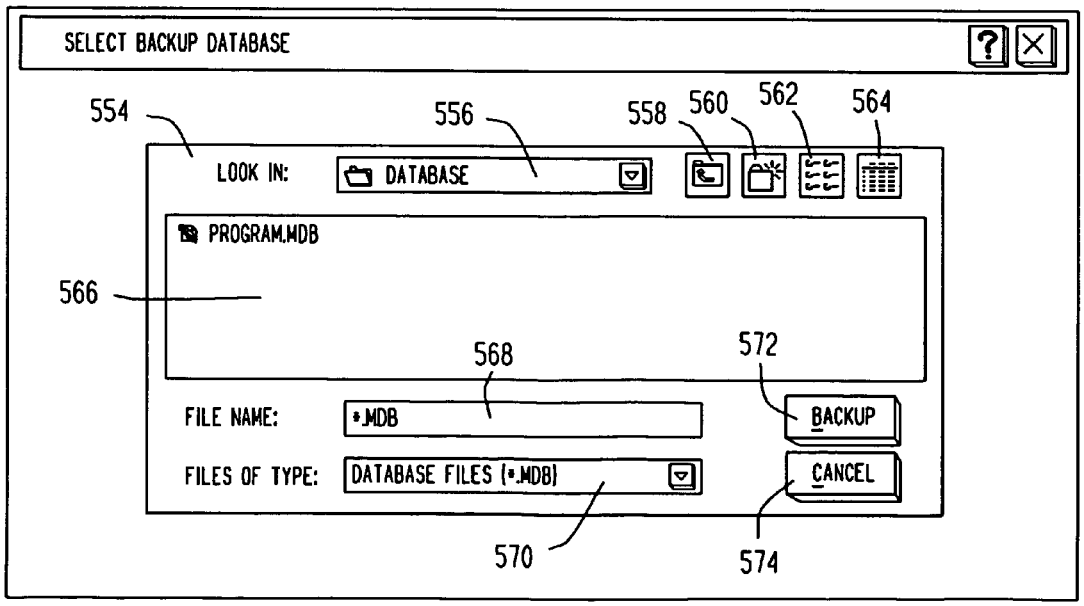
FIG. 17 is an illustration of a backup file selection window called from FIG. 16.

When step 490 of FIG. 14 calls the backup procedure of FIG. 15, step 520 opens the backup the databases window 522 of FIG. 16. The window 522 includes an edit control 524 for displaying the path and name of the current program database, an edit control 526 for displaying the path and name of a program database backup, a first browse button 528, an edit control 530 for displaying the path and name of the current data checker database, an edit control 532 for displaying the path and name of a data checker database backup, a second browse button 534, an ok button 536 and a cancel button 538. Step 542 displays the names of the active program and data checker databases in the boxes 524 and 530. It is determined in step 544 if backup names have been previously set, and if true, step 546 displays the path and names of the previous backups in the boxes 526 and 532. User input is enabled in step 548. Clicking on the first browse button 528 is detected by step 550 to branch to step 552 which displays the pop-up program backup file selection window 554 as shown in FIG. 17. The window 554 includes a folder or path name select box 556 with associated conventional display back one level button 558, display desktop files and folders button 560, list files and folders button 562 and show file and folder details button 564, a file/folder selection list box 566, a file name edit control box 568, a file type edit control box 570, a backup button 572 and a cancel button 574. User input is enabled by step 576. If the cancel button 574 is selected, steps 578 and 579 remove the window 554 and return the program to the backup procedure using window 522 of FIG. 16. Step 580 senses selection of the backup button 572 to proceed to step 582 where the name in the file edit control 568 with its corresponding folder path is set as the backup path and file name for backup edit control 526 before removing the window 554 and returning to the backup window of FIG. 16 where step 546 then displays the set backup path and filename in the box 526. Clicking on the second browse button 534 is detected by step 586 to branch to step 588 which displays the data checker pop-up backup file selection window similar to the window 554 shown in FIG. 17. User input is enabled by step 590. If the cancel button 574 is selected, steps 592 and 579 remove the window 554 and return the program to the backup procedure using window 522 of FIG. 15. Step 594 senses selection of the backup button 572 to proceed to step 596 where the name in the file edit control 568 with its corresponding folder path is set as the data checker backup path and file name before removing the window 554 and returning to the backup window of FIG. 16 where step 546 then displays the set data checker backup path and filename in the box 532. Selection of cancel button 538 is sensed at step 600 to return to the main menu procedure of FIG. 9. If the ok button 536 is selected, step 602 proceeds to step 604 where it is determined if the active database path and file names are the same as the backup path and filenames. If true, step 606 displays a message that the backup cannot be made over the current database. Otherwise it is determined in step 608 if a backup file or files of the same path and name exists, and if true, step 610 copies the current active database over the prior backup file or files. If step 608 is false, step 612 makes a new file or files with the backup names and copies the active database to the new file or files before returning to the main menu procedure of FIG. 9.

Figure 18:
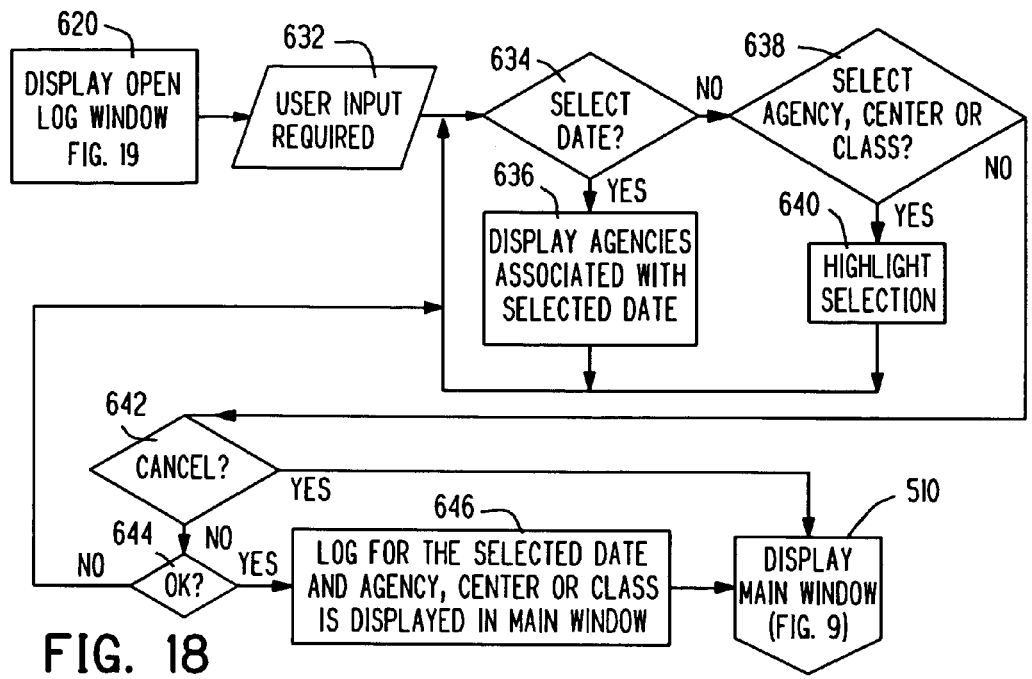
FIG. 18 is a flow diagram of an open log procedure in the data checking system program of FIG. 9.
Figure 19:
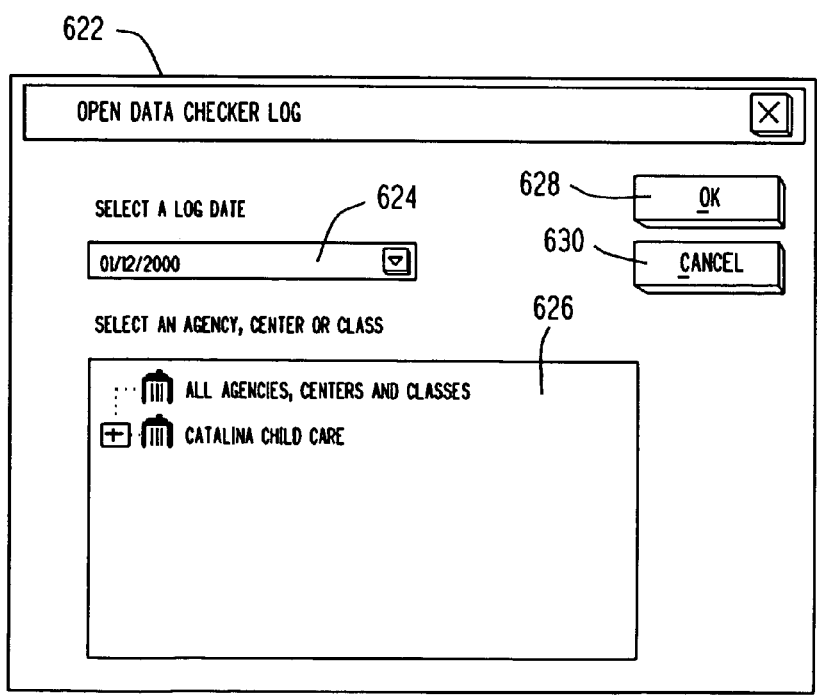
FIG. 19 is an illustration of a window displayed during the open log procedure of FIG. 18.

Selection of the menu item "open data checker log" in the file menu 472 of FIG. 14 results in step 492 calling the procedure of FIG. 18 starting with step 620 which displays the pop-up open log window 622 of FIG. 19. The window 622 includes a date edit control box 624, an agency/center/class selection tree box 626, an ok button 628 and a cancel button 630. In step 632, user input is enabled. If the date edit control box 624 is used to select a date, step 634 branches to step 636 where the agencies, centers and classes having logs for the selected date are displayed in the box 626. Step 638 detects user input in the agency/center/class selection box including tree expansion and reduction and selection of an item. When a tree item is selected, step 640 highlights the selected item. Clicking on the cancel button 630 is sensed in step 642 to erase the pop-up window and return to step 510 in the main data checker program of FIG. 9. When the ok button 628 is selected, step 644 branches to step 646 to place the data checker log for the selected date and agency, center or class in the data checker log window 408 of FIG. 10.

Figure 20:
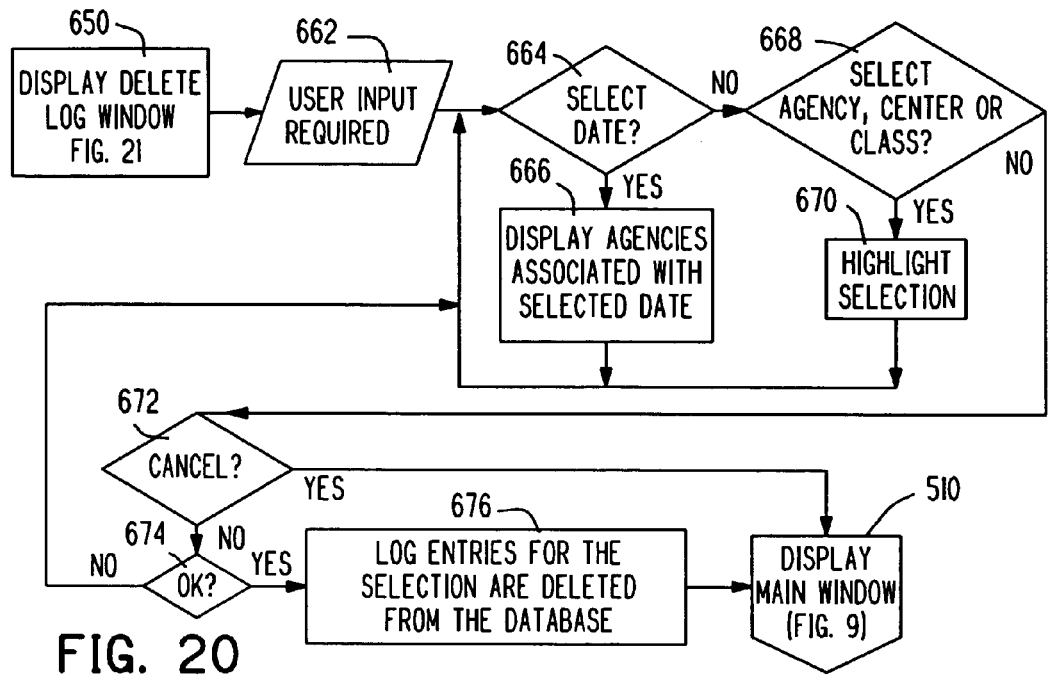
FIG. 20 is a flow diagram of a log procedure in the data checking system program of FIG. 9.
Figure 21:
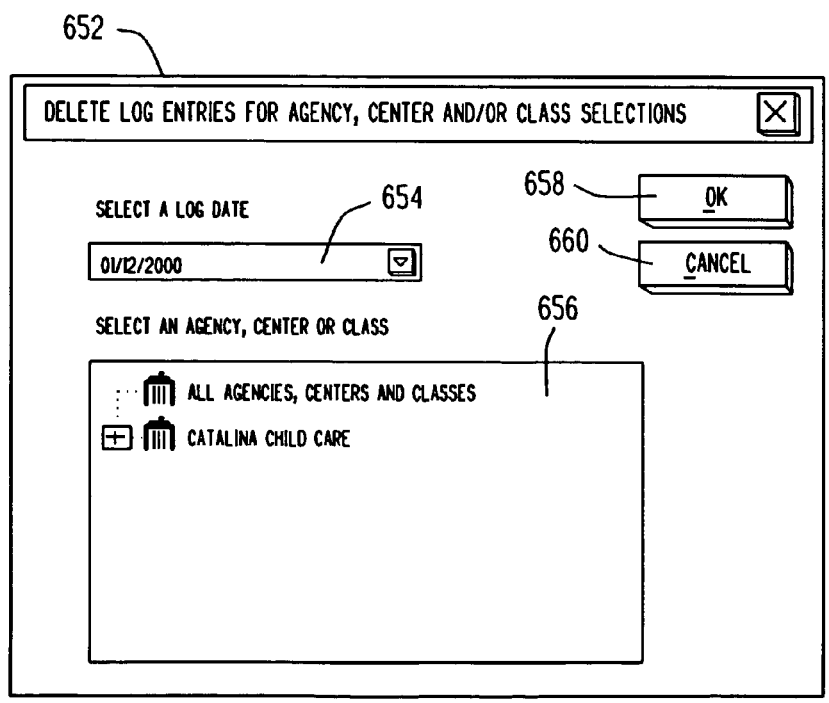
FIG. 21 is an illustration of a window displayed during the delete log procedure of FIG. 20.

When the menu item "delete log entries" in the file menu 472 of FIG. 11 is selected, step 494 calls step 650 of the delete log entries procedure of FIG. 20 which displays the pop-up delete log entries window 652 of FIG. 21. The window 652 includes a date edit control box 654, an agency/center/class selection tree box 656, an ok button 658 and a cancel button 660. In step 662, user input is enabled. If the date edit control box 654 is used to select a date, step 664 branches to step 666 where the agencies, centers and classes for the selected date are displayed in the box 656. Step 668 detects user input in the agency/center/class selection box including tree expansion and reduction and selection of an item. When a tree item is selected, step 670 highlights the selected item. Clicking on the cancel button 660 is sensed in step 672 to erase the pop-up window 652 and to return to the main program at step 510. When the ok button 658 is selected, step 674 branches to step 676 where the data checker log entries for the selected date and agency, center or class are deleted from the data checker database after which the pop-up window 652 is erased and the program returns to step 510 of FIG. 9.

Figure 22:
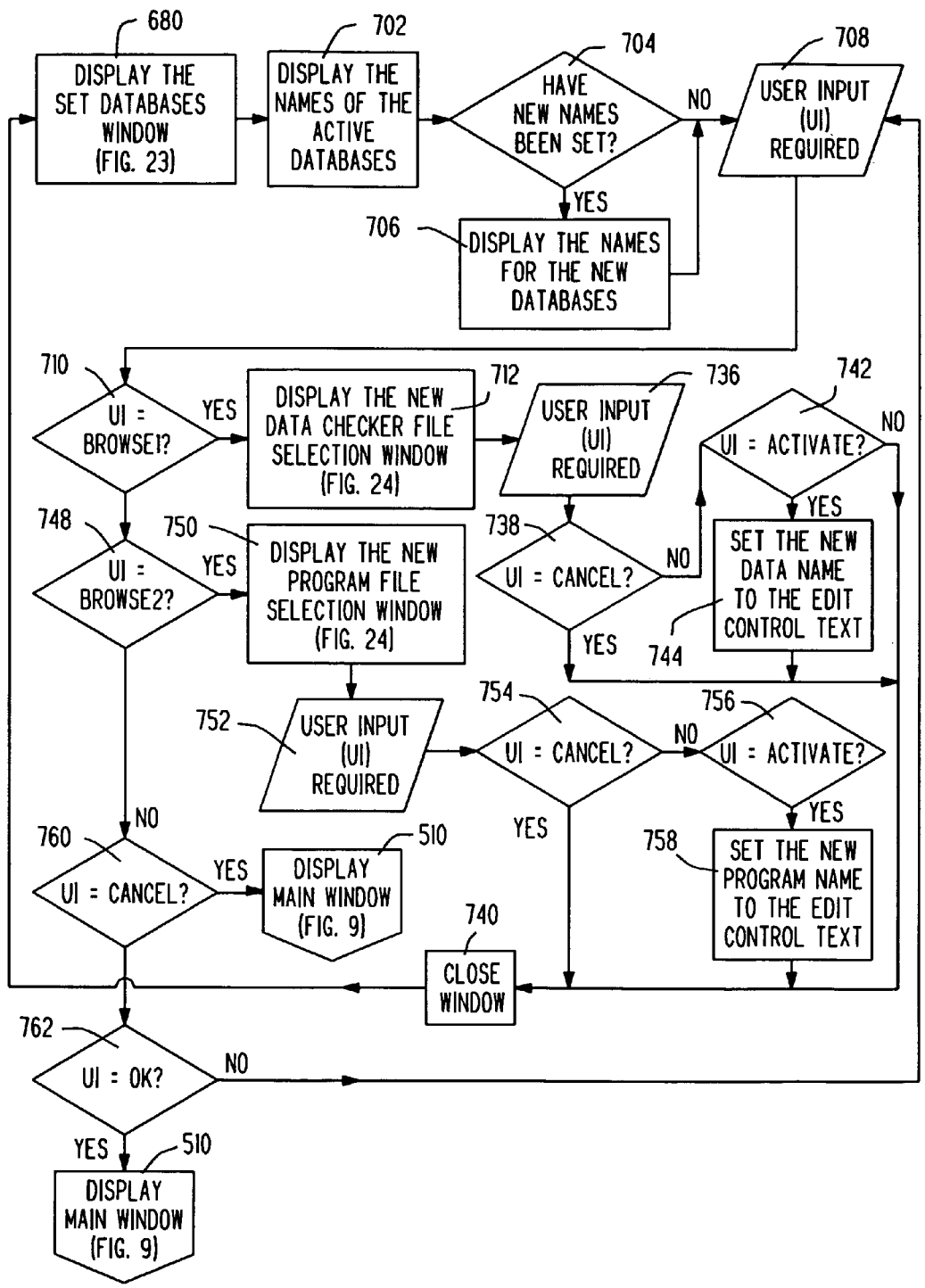
FIG. 22 is a flow diagram of a set databases procedure in the data checking system program of FIG. 9.
Figure 23:
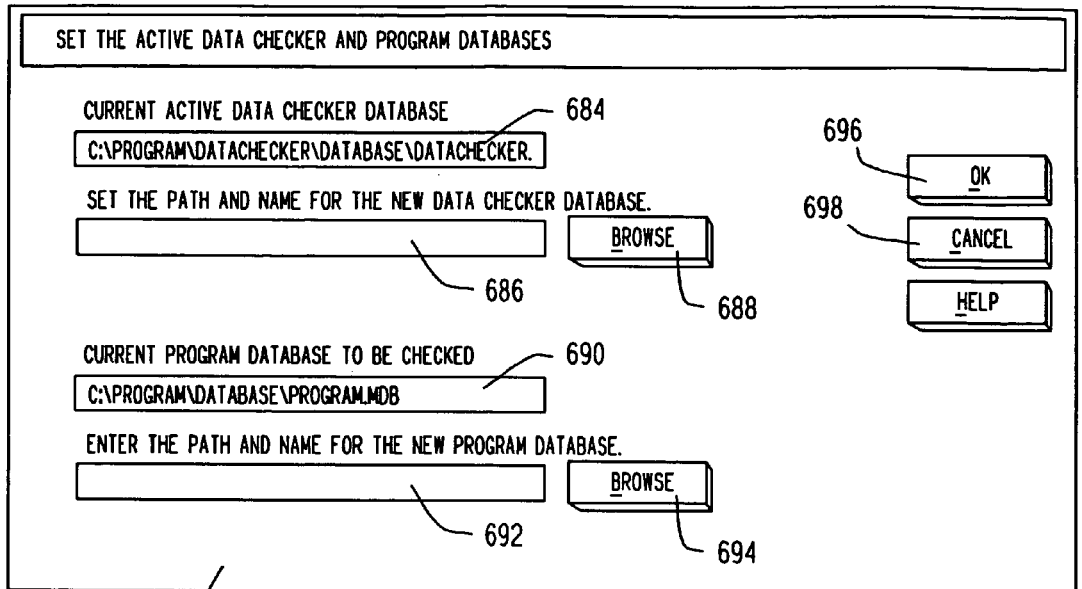
FIG. 23 is an illustration of a window displayed during the set databases procedure of FIG. 22.
Figure 24:
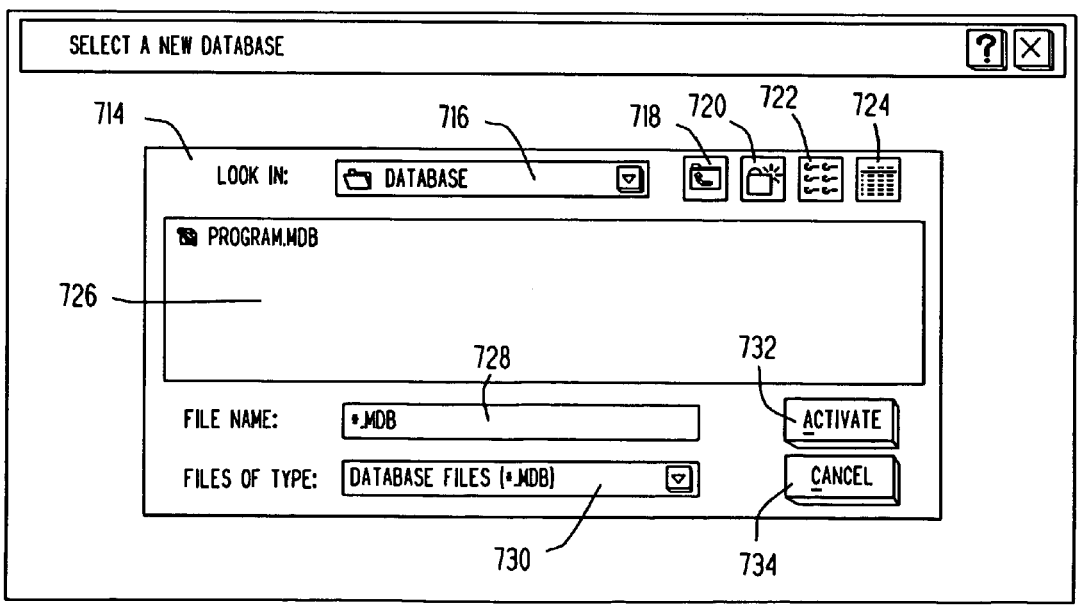
FIG. 24 is an illustration of the set the active database window of FIG. 23 with a superimposed database selection window.

When step 496 of FIG. 14 calls the set databases procedure of FIG. 22, step 680 opens the set active data checker and program databases window 682 of FIG. 23. The window 682 includes an edit control 684 for displaying the path and name of the current data checker database, an edit control 686 for selecting or entering the path and name of a new data checker database, a first browse button 688, an edit control 690 for displaying the path and name of the current program database, an edit control 692 for selecting or entering the path and name of a new program database, a second browse button 694, an ok button 696 and a cancel button 698. Step 702 displays the names of the active data checker and program databases in the boxes 684 and 690. It is determined in step 704 if new names have been previously set, and if true, step 706 displays the path and new names of the in the boxes 686 and 692. User input is enabled in step 708. Clicking on the first browse button 688 is detected by step 710 to branch to step 712 which displays the pop-up file selection window 714 as shown in FIG. 24. The window 714 includes a folder or path name select box 716 with associated conventional display back one level button 718, display desktop files and folders button 720, list files and folders button 722 and show file and folder details button 724, a file/folder selection list box 726, a file name edit control box 728, a file type edit control box 730, an active button 732 and a cancel button 734. User input is enabled by step 736. If the cancel button 734 is selected, steps 740 and 680 remove the window 714 and return the program to the procedure using window 682 of FIG. 23. Step 742 senses selection of the activate button 732 to proceed to step 744 where the selected new file name with its corresponding folder path is activated and placed in the file edit control 684 as the current path and data checker database file name before removing the window 714 and returning to the set active data checker and program window of FIG. 23. Clicking on the second browse button 694 is detected by step 748 to branch to step 750 which displays the program pop-up file selection window similar to the window 714 shown in FIG. 24. User input is enabled by step 752. If the cancel button 734 is selected, steps 740 and 706 remove the window 714 and return the program to the set active data checker and program databases procedure using window 682 of FIG. 23. Step 756 senses selection of the activate button 732 to proceed to step 758 where the name in the file edit control 728 with its corresponding folder path is set as the new active path and file name before removing the window 714 and returning to the set active data checker and program databases window of FIG. 23 where step 702 then displays the new program path and filename in the box 690. Selection of cancel button 698 is sensed at step 760 to return to the main menu procedure of FIG. 9. Similarly if the ok button 696 is selected, step 762 returns to the main menu procedure at step 510.

Figure 25:
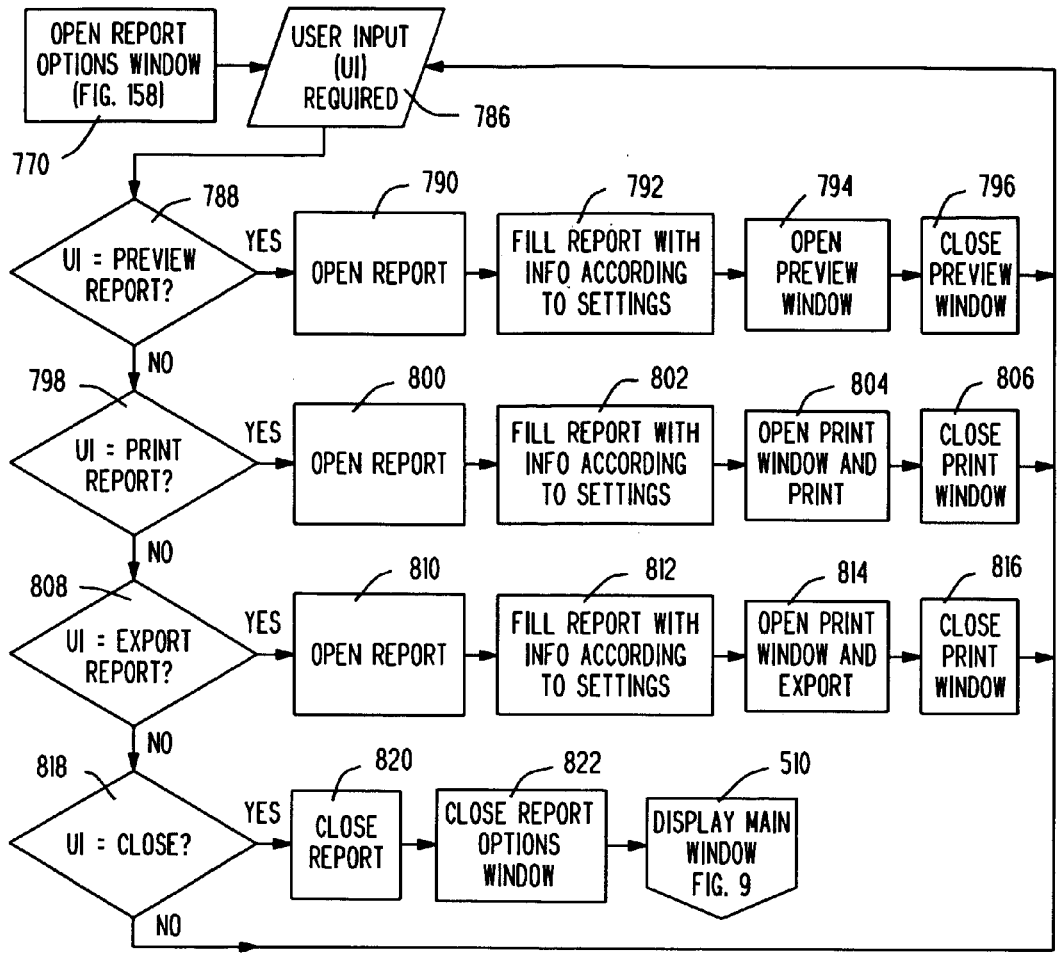
FIG. 25 is a flow diagram of a print/export procedure in the data checking system program of FIG. 9.
Figure 26:
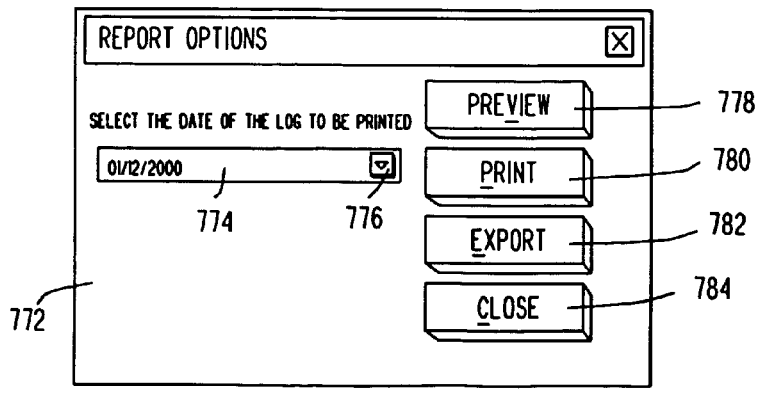
FIG. 26 is an illustration of a pop-up print/export window displayed during the print/export procedure of FIG. 25.

In the print/export procedure of FIG. 25 which is called by step 498 in FIG. 14, step 770 opens the pop-up window 772 of FIG. 26. The window 772 includes a date selection box 774 displaying the most recent data checker log file with a button 776 for displaying a list of available data checker log files, a preview button 778, a print button 780, an export button 782 and a close button 784. User input is enabled in step 786. When the preview button 778 is selected, step 788 branches to step 790 which opens a previously set data checker log report such as in a Crystal Reports procedure. Information is then placed in the report at step 792 in accordance with the report settings and the log file of the previously selected date. Then in step 794 the report is displayed in a conventional preview window. Selection of the print button 780 is sensed in step 798 to proceed to step 800 where the data checker log report is opened and then to step 802 where the information is placed in the report. Step 804 opens a conventional print window enabling the printing of the report after which the print window is closed in step 806. Selection of the export button 782 is sensed by step 808 to call steps 810, 812, 814 and 816 which are similar to the printing steps 800, 802, 804 and 806 except that the report is written into a file selected or created in step 814. Clicking on the close button 784 is detected in step 818 and results in closing the report in step 822, closing the report options window 772 in step 822 and returning to the main program at step 510 in FIG. 9.

Figure 27:
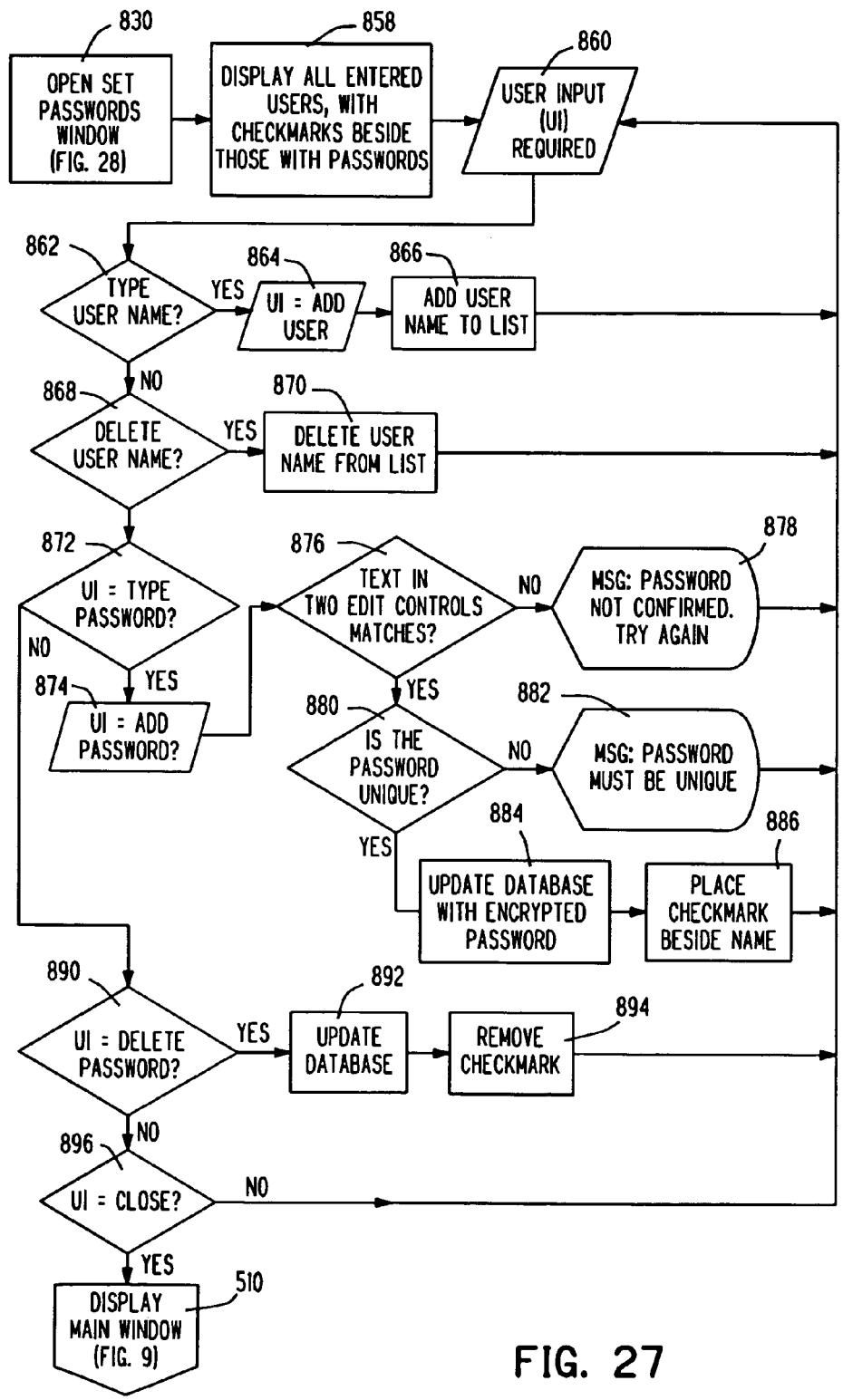
FIG. 27 is a flow diagram of a set password procedure in the data checking system program of FIG. 9.
Figure 28:
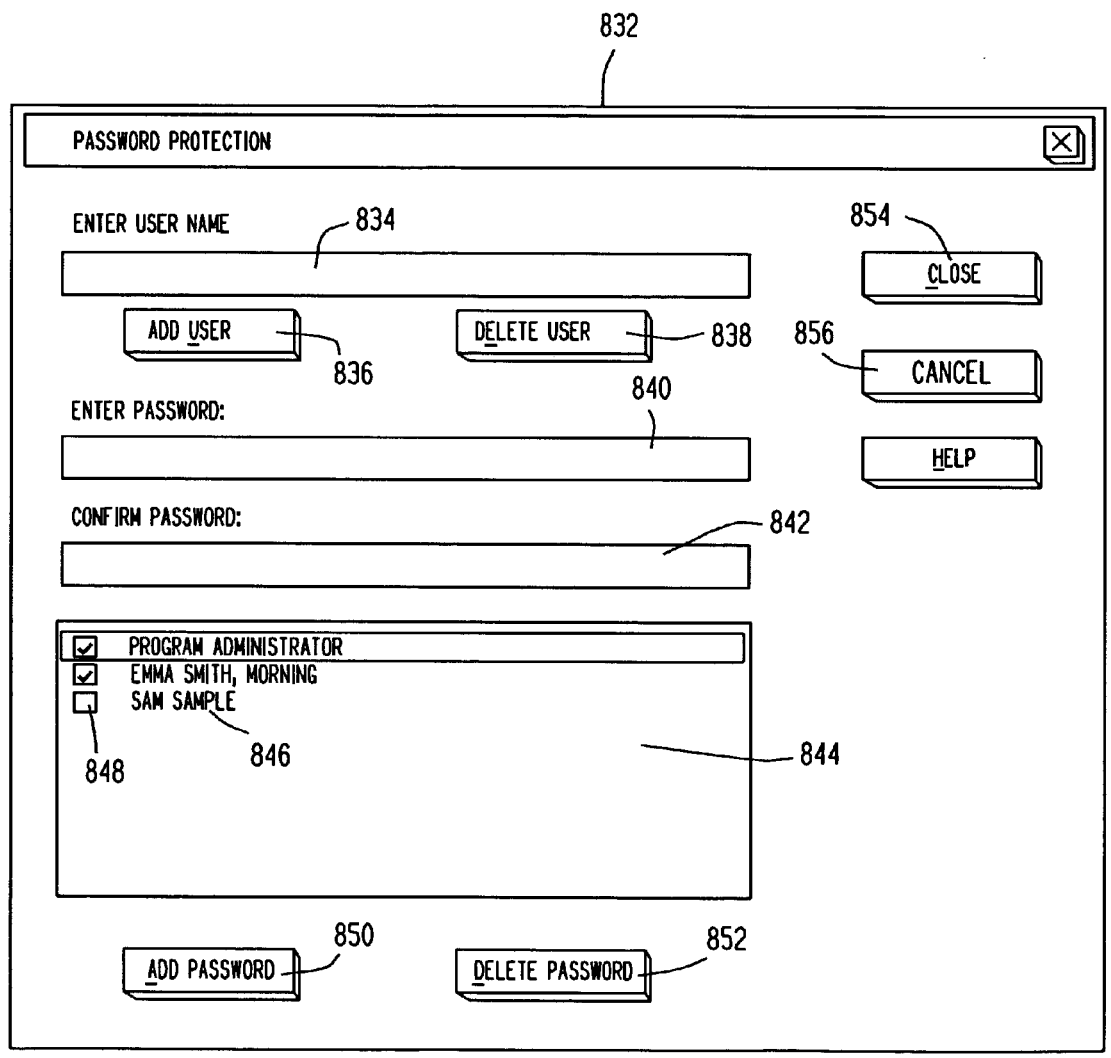
FIG. 28 is an illustration of a set password window displayed during the set password procedure of FIG. 27.

The set passwords procedure of FIG. 27 is called from the file menu 472 at step 500 of FIG. 14 to set up passwords for the system. In step 830 the set password window 832 of FIG. 28 is opened. This window 832 includes user name edit control 834 with add user button 836 and delete user button 838, enter password edit control 840, confirm password edit control 842, user list box for listing names 846 of users with check boxes 848, add password button 850, delete password button 852, close button 854 and cancel button 856. In step 858, the names of all users are listed in the box 844 with the checkmarks in the boxes 848 of all users having passwords. Step 860 enables user input. When a name is typed in the user name edit control 834 and the add user button 836 is selected, steps 862 and 864 are true to proceed to step 866 where the typed name is added to the list of users in box 844. When a currently listed user name is seleted in edit control box 834, such as by clicking on the name in the list box 844, clicking on the delete user button 838 is sensed in step 868 to delete the selected name from the list in step 870. Passwords are added for a selected user in the list box by typing in password (hidden behind xxx) in the password boxes 840 and 842 and clicking on the add password button 840 in steps 872 and 874. In step 876 the passwords entered in boxes 840 and 842 are compared with each other. If the two typed entries do not match, step 878 displays a message that passwords are not confirmed and the user must try again. If there is a match, step 880 determines if the password is unique or differs from all the other passwords. When the password is not unique, a message that the password must be unique is displayed by step 882. If step 880 is true, step 884 updates the database with the encrypted password. Step 886 places a checkmark beside the name in the list. Step 890 detects the selection of the delete password button 852 causing the program to proceed to step 892 where the database is updated to reflect deletion of the password for the selected user and then to step 894 where the checkmark is removed from beside the highlighted user. Selection of the close button 854 results in the program at step 896 returning to the main procedure of FIG. 9.

Figure 29:
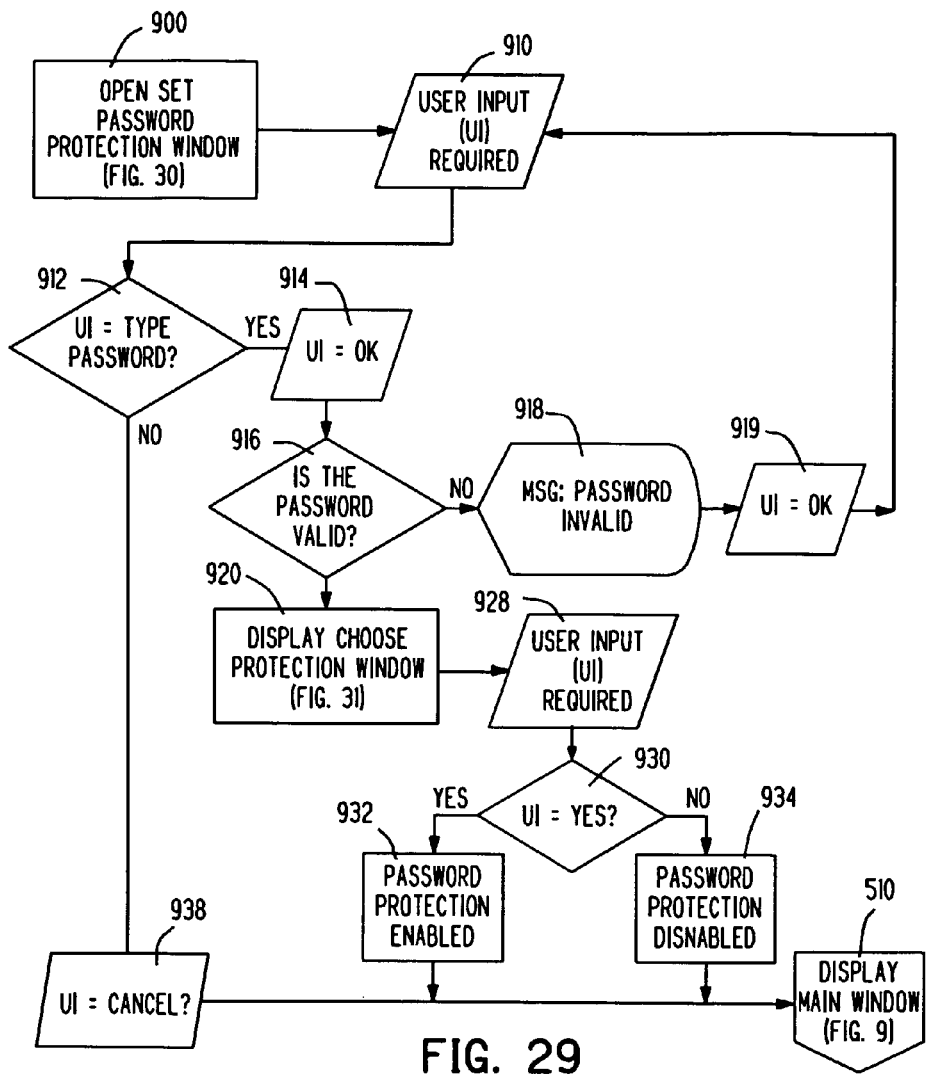
FIG. 29 is a flow diagram of a set password protection procedure in the data checking system program.
Figures 30, 31:
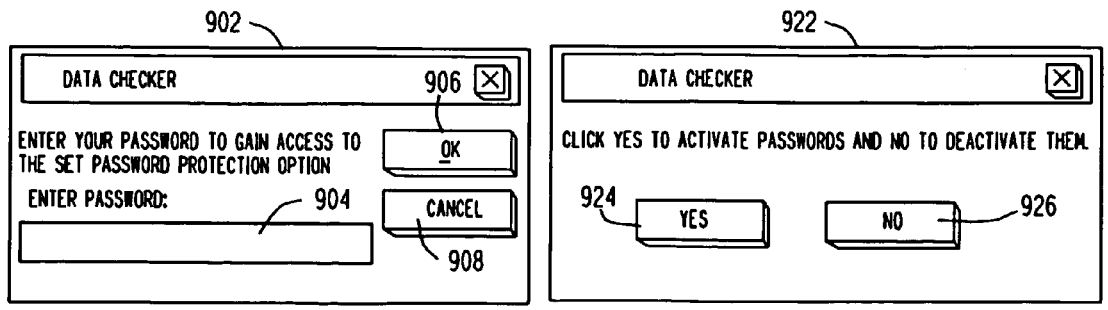
FIG. 30 is an illustration of a set password protection window displayed during the set password protection procedure of FIG. 29.
FIG. 31 is an illustration of second set password protection window displayed during the set password protection procedure of FIG. 29.

A set password protection procedure of FIG. 29 is called by step 502 of FIG. 14. In step 900 a pop-up password protection window 902 of FIG. 30 is displayed. This window 902 includes a password edit control box (entry displayed as xxxx) 904, an ok button 906 and a cancel button 908. In step 910, user input is enabled. Step 912 detects entry of typing in the password edit control 904 and step 914 senses clicking on the ok button 906. The entered typing is compared to the encrypted stored passwords in step 916 to determine if valid. If false, a message box (not shown) is displayed in step 918 that the password is invalid. Acknowledgment of the message by clicking on ok (not shown) is required in step 919. If the password is found valid, step 920 calls a second pop-up window 922 of FIG. 31 which includes yes button 924 and no button 926. User input is enabled for the window 922 in step 928 and selection of the yes or no button 924 or 926 is determined in step 930. If yes, password protection is enabled in step 932 and if no, password protection is disabled in step 934. Selection of the cancel button 908 in the window 902 is detected by step 938. From either step 932, step 934 or step 938, the program returns to the main program and step 510 of FIG. 9.

Figure 32:
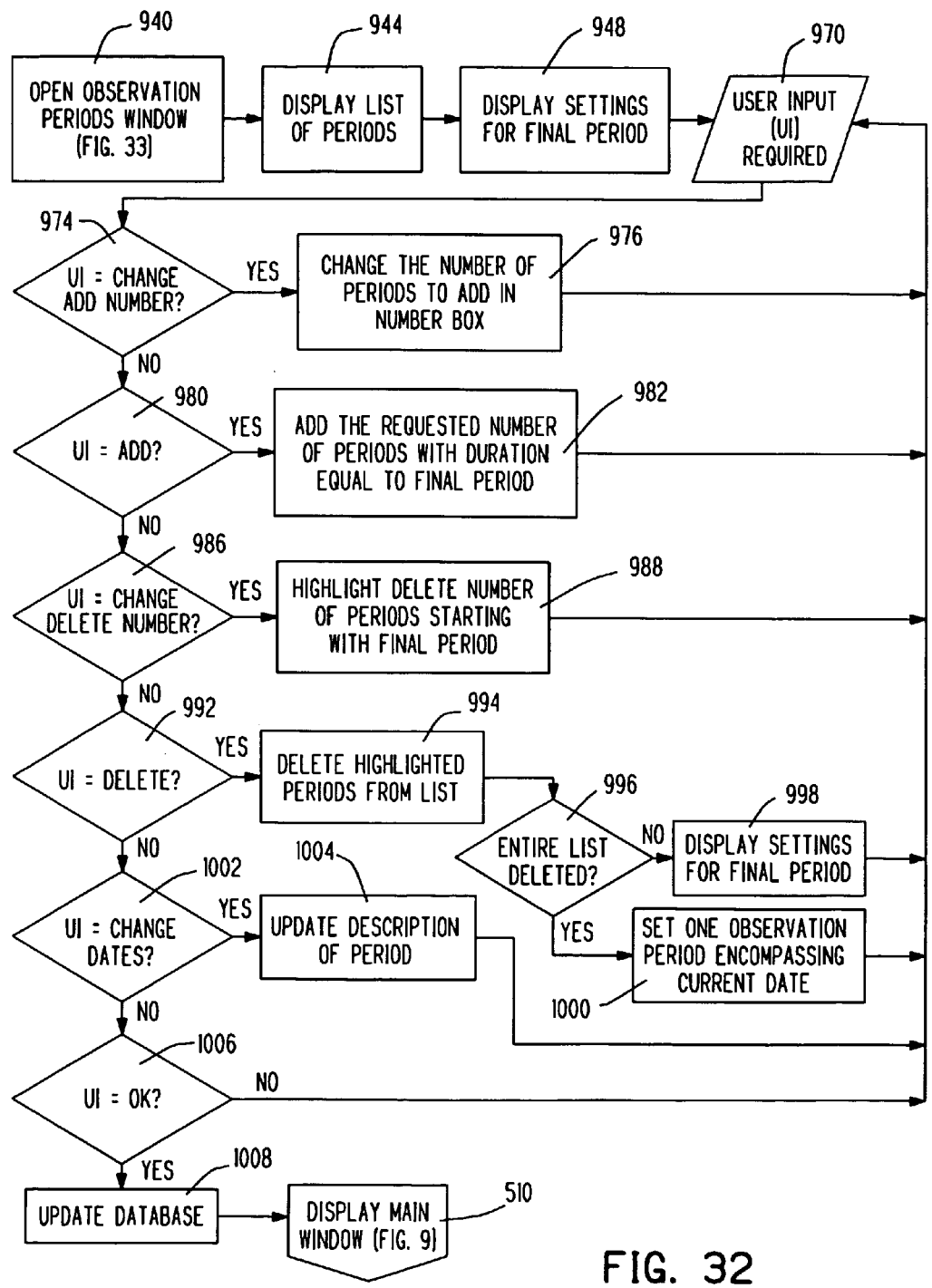
FIG. 32 is a flow diagram of a set observation periods procedure in the data checking system program of FIG. 9.
Figure 33:
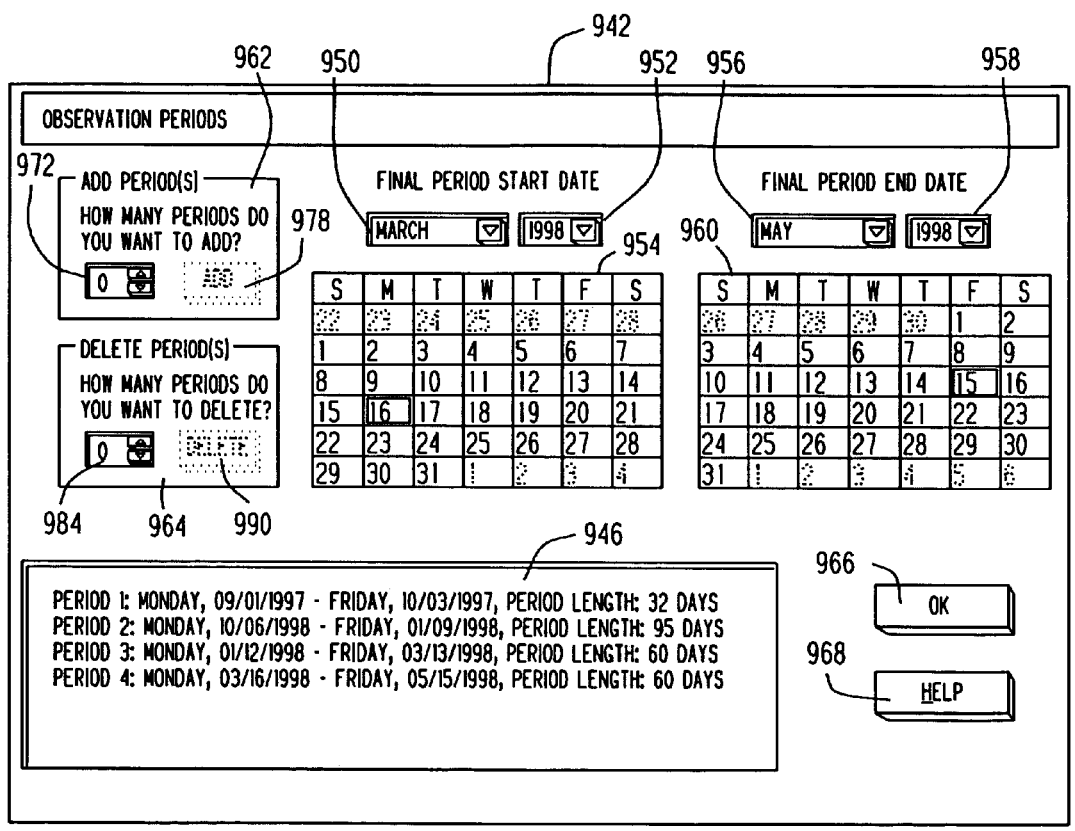
FIG. 33 is an illustration of a window displayed during the set observation periods procedure of FIG. 32.

In the observations period procedure of FIG. 32, step 940 displays the observations period window 942 of FIG. 33. Then in step 944, a periods list box 946 is displayed in the window and contains a list of observation periods for the current agency. In step 948 final period settings are placed in start month edit control box 950, start year edit control box 952, start day calendar 954, end month edit control box 956, end year edit control box 958 and end day calendar 960. The window also includes an add period(s) box 962, a delete period(s) box 964, an OK button 966 and a help button 968. User input is enabled in step 970. The add period(s) box 962 contains an edit control 972 for the user in step 974 indicating a number of periods to be added in step 976 to the period list box 946. Operation of an add button 978 is sensed in step 980 to branch to step 982 where the requested number of periods are added to the period list in the box 946. Each of the added periods has its duration equal to the previous last period with the start and end dates correspondingly set. The delete period(s) box 964 contains an edit control box 984 in which the user can set the number of periods to be deleted. Step 986 senses a change in the deletion number in control 984 and step 988 highlights the periods to be deleted, starting with the last period, in the period list box 946. Then when clicking on a delete button 990 in the delete periods box 964 is sensed in step 992, step 994 deletes the highlighted periods from the list in the periods list box 946. In step 996 it is determined if the entire list has been deleted. If false, step 998 displays the settings for the new final period in the start date and end date edit controls, and if true, step 1000 sets a default observation period encompassing the current date which is inserted into the periods list box along with placement of corresponding date information in the start and end date control boxes. When the start date or end date in edit control boxes 950, 952, 954, 956, 958 and 960 is changed by the operator, step 1002 branches to step 1004 where corresponding changes are made to the description of the last observation period in the box 946. Selection of the OK button 966 in step 1006 results in step 1008 updating the database information and return to the main procedure of FIG. 9 in step 510.

Figure 12:
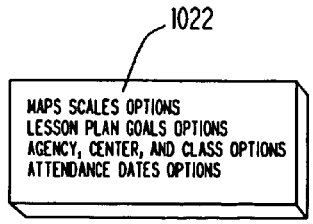
FIG. 12 is an illustration of an options pop-up window displayed in the main procedure window of FIG. 10 during an options procedure of FIG. 34.
Figure 13:
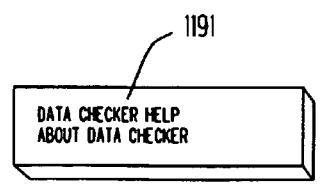
FIG. 13 is an illustration of a pop-up help menu displayed in the main window of FIG. 10 during the help menu procedure of FIG. 43.
Figure 34:
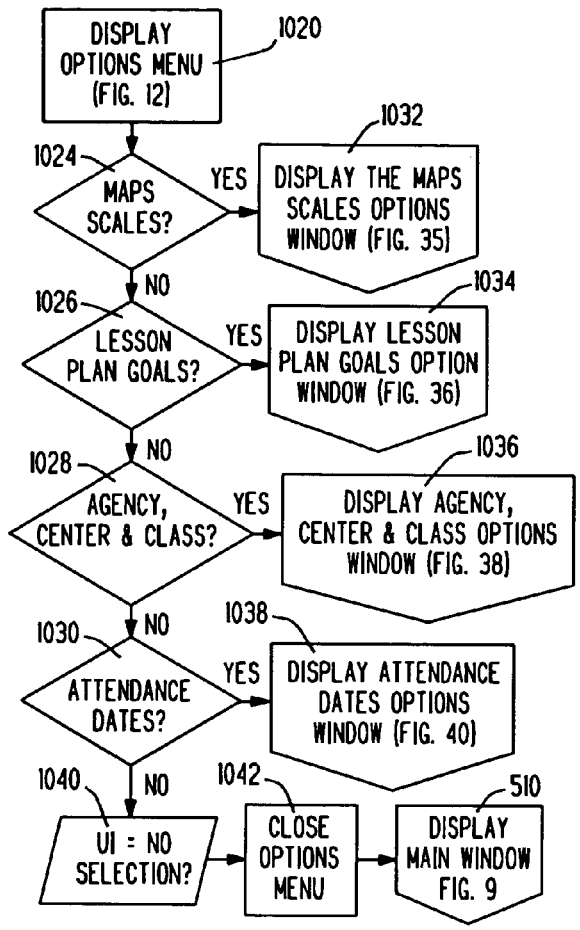
FIG. 34 is a flow diagram of a options menu procedure in the data checking program of FIG. 9.

When the menu item "options" is selected in the menu bar of FIG. 10, step 458 of FIG. 9 calls the options menu procedure of FIG. 34. In step 1020, the options menu 1022 of FIG. 12 is display. The menu 1022 contains the items "MAPS scales options", "lesson plan goals options", "agency, center, and class options" and "attendance dates options". Selection or clicking on one of these items is detected by the corresponding step 1024, 1026, 1028 or 1030 to branch to the respective step 1032, 1034, 1036 or 1038 calling the procedure "display the MAPS scales options", "display lesson plan goals options", "display agency, center and class options" or "display attendance dates options". If a mouse click is performed without pointing to a selection on the menu 1022, step 1040 branches to step 1042 where the options menu 1022 is removed and back to the main program at step 510 in FIG. 9.

Figure 35:
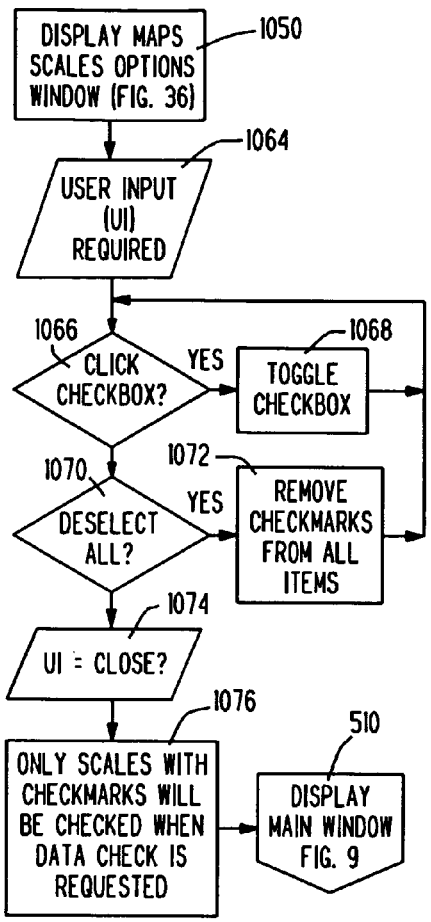
FIG. 35 is a flow diagram of a scales options procedure in data checking program of FIG. 9.
Figure 36:
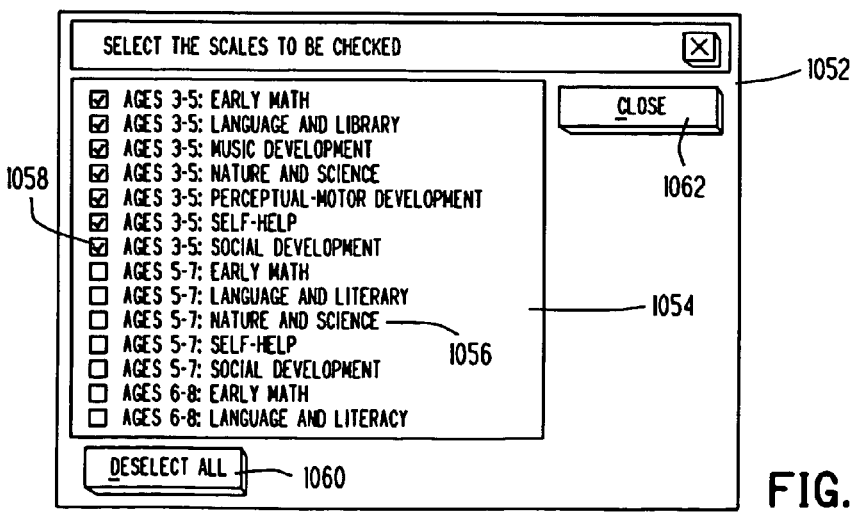
FIG. 36 is an illustration of a scales options window displayed in the scales options procedure of FIG. 35.

Step 1032 calls the MAPS scales options procedure of FIG. 35 where step 1050 displays the window 1052 of FIG. 36 which includes a scales list box 1054 which lists all the scales 1056 with corresponding check boxes 1058. Additionally the window 1052 includes a deselect all button 1060 and a close button 1052. User input is enabled in step 1064. Clicking on one of the listed scales or the corresponding checkbox is detected in step 1066 to branch to step 1068 where the selected checkbox is toggled, unchecked changed to checked or checked changed to unchecked. When the deselect all button 1060 is selected, step 1070 branches to step 1072 which removes all the check marks from the boxes 1058 in the list box 1054. Scales 1056 are recorded for each student to record achievement or status of the student with respect to learning capabilities within the developmental or knowledge area of each scale. By selecting particular scales to be checked, only those scales appropriate to a class, center or agency will be checked to determine if such records have been completed. Selection of the close button 1062 is detected in step 1074 to advance to step 1076 where the data checker is set up to check only the checked scales when a data check is requested. The procedure then returns to step 510 of FIG. 9.

Figure 37:
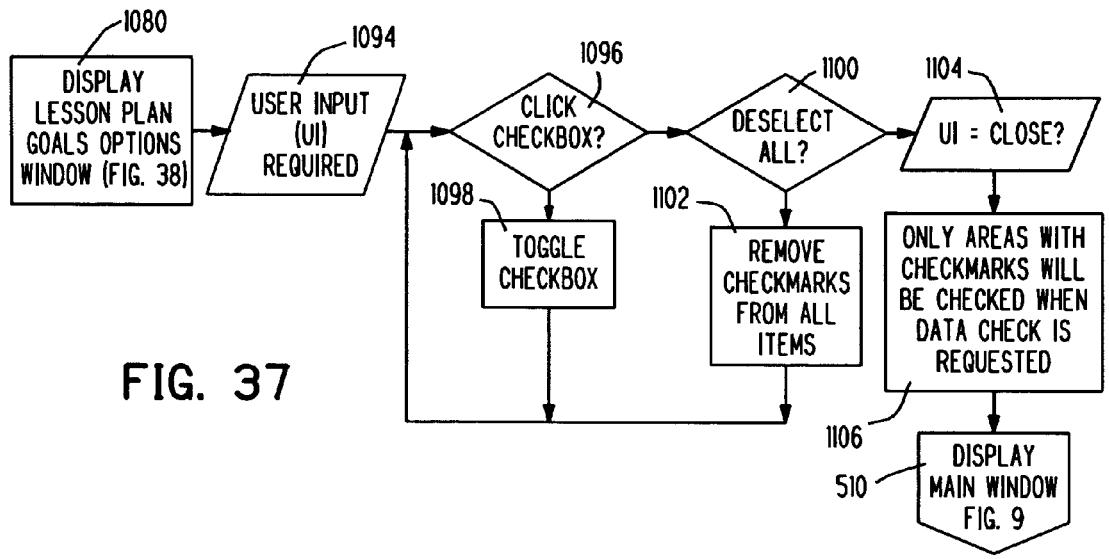
FIG. 37 is a flow diagram of a lesson plan goals options procedure in the data checking program of FIG. 9.
Figure 38:
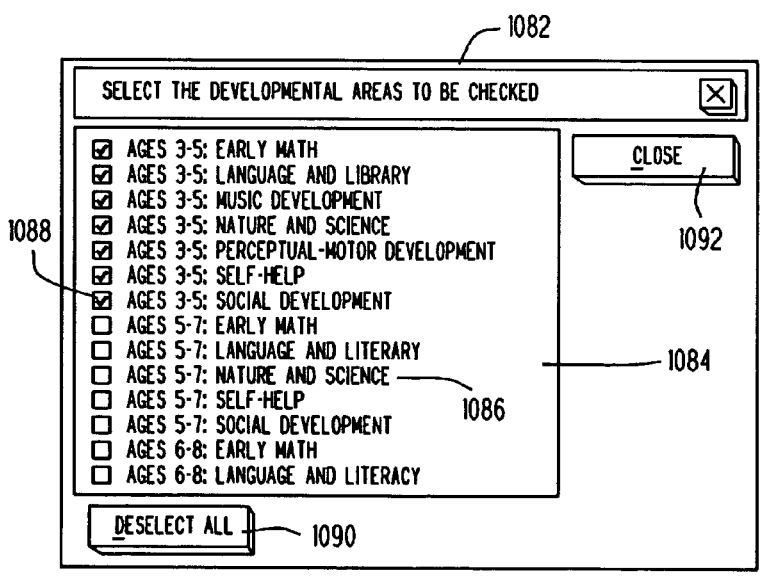
FIG. 38 is an illustration of a lesson plan goals options window displayed in the lesson plan goals options procedure of FIG. 37.

Step 1034 of FIG. 34 calls the lesson plan goals options procedure of FIG. 37 where step 1080 displays the window 1082 in FIG. 38 which includes a goal area list box 1084 which lists all the goal areas 1086 with corresponding check boxes 1088. Additionally the window 1082 includes a deselect all button 1090 and a close button 1092. User input is enabled in step 1094. Clicking on one of the listed lesson plan areas or the corresponding checkbox is detected in step 1096 to branch to step 1098 where the selected checkbox is toggled, unchecked changed to checked or checked changed to unchecked. When the deselect all button 1090 is selected, step 1100 branches to step 1102 which removes all the check marks from the boxes 1088 in the list box 1084. Lesson plans are made by teachers for each of the knowledge or developmental areas listed in the box 1084. By selecting particular developmental areas to be checked, only those lesson plans appropriate to a class, center or agency will be checked to determine if such lesson plans have been completed. Selection of the close button 1092 is detected in step 1104 to advance to step 1106 where the data checker is set up to check only the checked area for lesson plans when a data check is requested. The procedure then returns to step 510 of FIG. 9.

Figure 39:
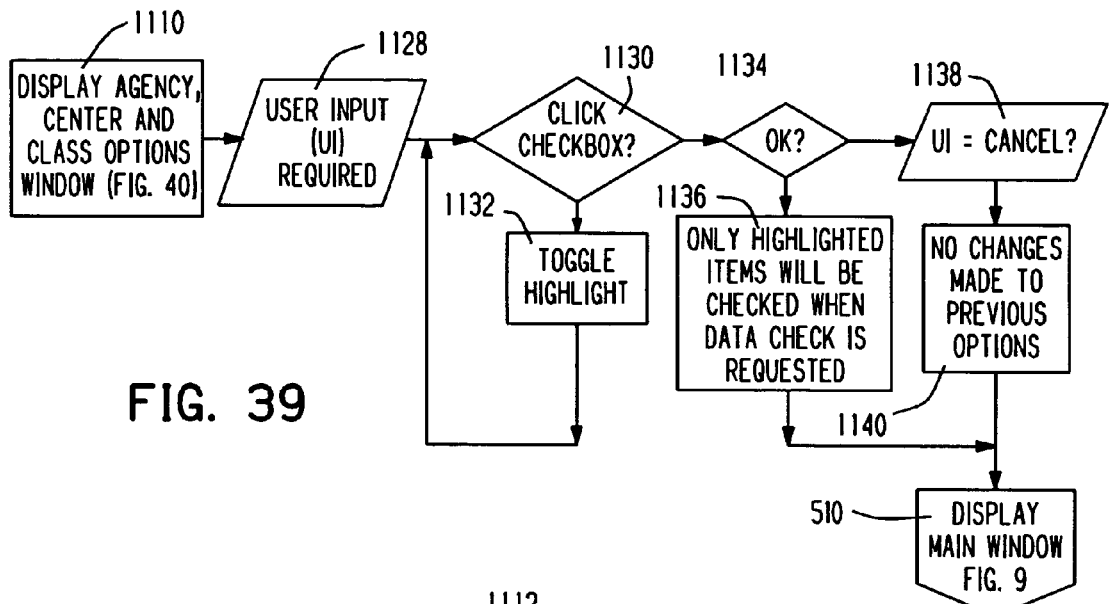
FIG. 39 is a flow diagram of an agency, center and class options procedure in the data checking program of FIG. 9.
Figure 40:
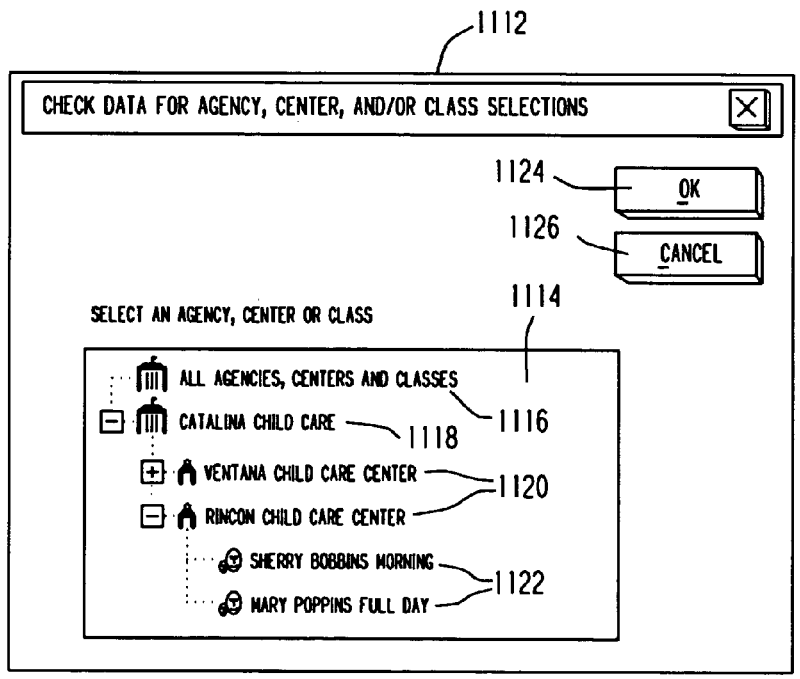
FIG. 40 is an illustration of an agency, center and class options window displayed in the agency, center and class options procedure of FIG. 38.

When the options menu item "agency, center and class options" is selected, step 1036 of FIG. 34 calls the procedure of FIG. 39. Step 1110 displays the agency, center and class selection window 1112 of FIG. 40. This window 1112 includes a selection window 1114 in which a tree with agency selections 1116 and 1118 being the highest order, center selections 1120 being the second order and class selections 1122 being the lowest order. Additionally the window 1112 includes an ok button 1124 and a cancel button 1126. Step 1128 enables user input. When an item in the box 1114 is clicked step 1130 branches to step 1132 where the selected item is highlighted if non-highlighted or non-highlighted if highlighted. Selection of the item 1116 select all agencies, centers and classes in the database. Selection of item 1118 selects only one listed agency and all centers and classes in that agency. Similarly selection of a center 1120 selects only that center and the classes within that center. Selection of a class 1122 selects only that class. Step 1134 senses clicking on the ok button 1124 to set up the data checker in step 1136 to check files of only the highlighted items when a data check is requested. If the cancel button 1126 is selected, step 1138 proceeds to step 1140 where no changes are made from a previously recorded agency, center and class selection. From steps 1136 and 1140 the program returns to step 510 of FIG. 9.

Figure 41:
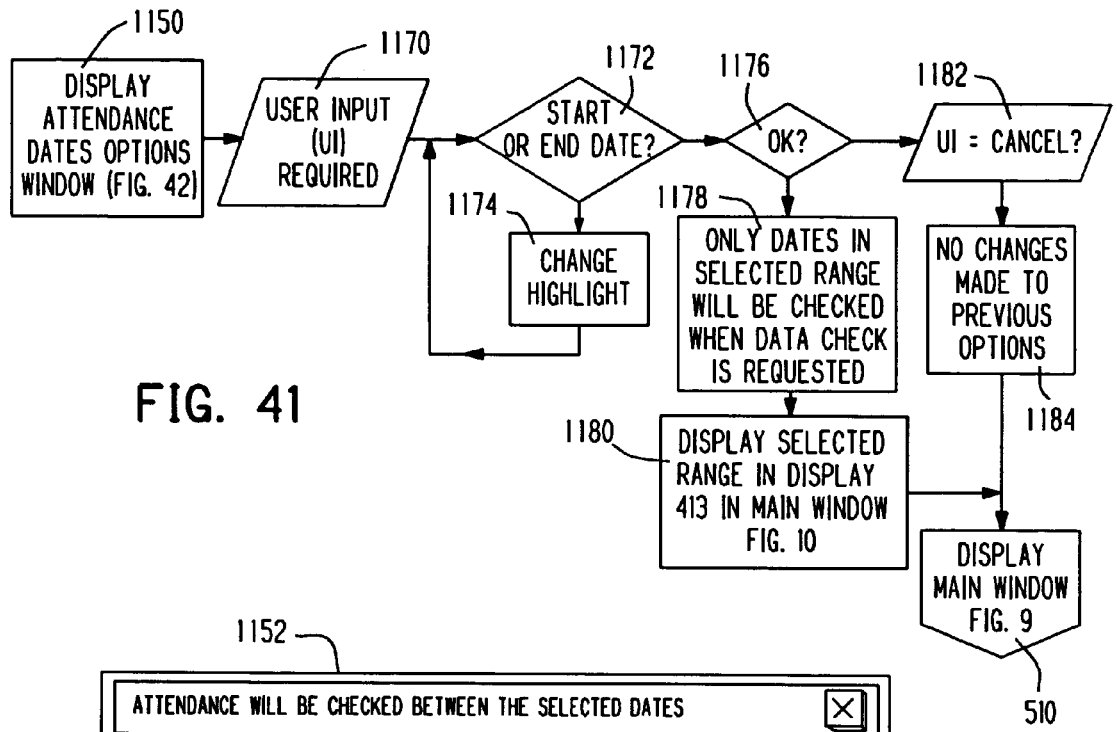
FIG. 41 is a flow diagram of an attendance dates options procedure in the data checking program of FIG. 9.
Figure 42:
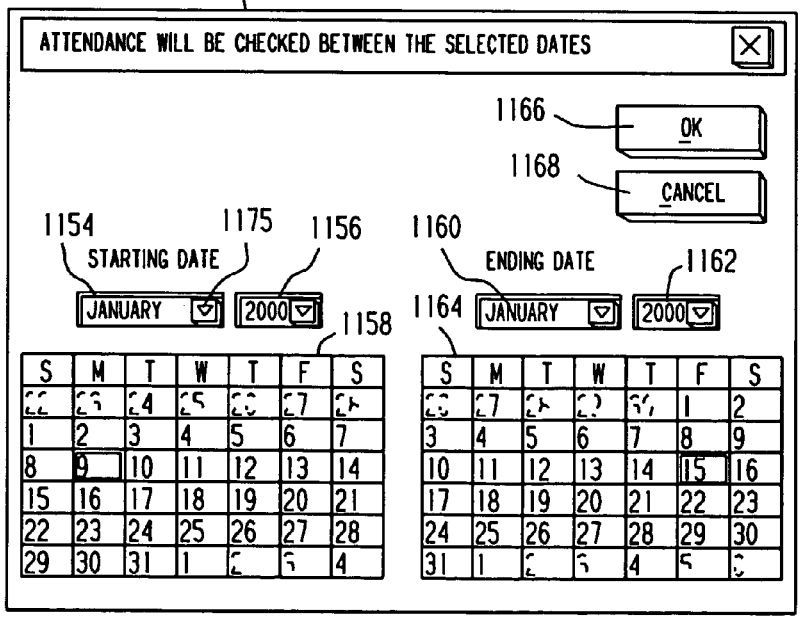
FIG. 42 is an illustration of an attendance dates options window displayed in the attendance dates options procedure of FIG. 41.

In an attendance dates options procedure of FIG. 41 called by step 1038 of FIG. 34, step 1150 displays the observations period window 1152 of FIG. 42. This window 1152 contains a starting date month edit control box 1154, a starting date year edit control box 1156, a starting date day calendar 1158, an ending date month edit control box 1160, and an ending date year edit control box 1162 and an ending date day calendar 1164. Also the window 1152 has an ok button 1166 and a cancel button 1168. User input is enable in step 1170. Clicking on any of the edit controls 1154, 1156, 1158, 1160, 1162 and 1164 is detected in step 1172 to branch to step 1174 where the selected item is highlighted or placed in the corresponding edit box. The edit boxes 1154, 1156, 1160 and 1162 contain buttons 1175 for displaying lists from which possible months and years are selected. When clicking of the ok button 1166 is sensed in step 1176, the program in step 1178 sets up the date range in which the existence of attendance records is to be checked when requested. Step 1180 displays this range in the display 413 of the main window 394 of FIG. 10. If the user clicks on the cancel button 1168, step 1182 proceeds to step 1184 where no changes are made to a previously saved date range. From steps 1180 and 1184 the program returns to step 510 of FIG. 9.

Figure 43:
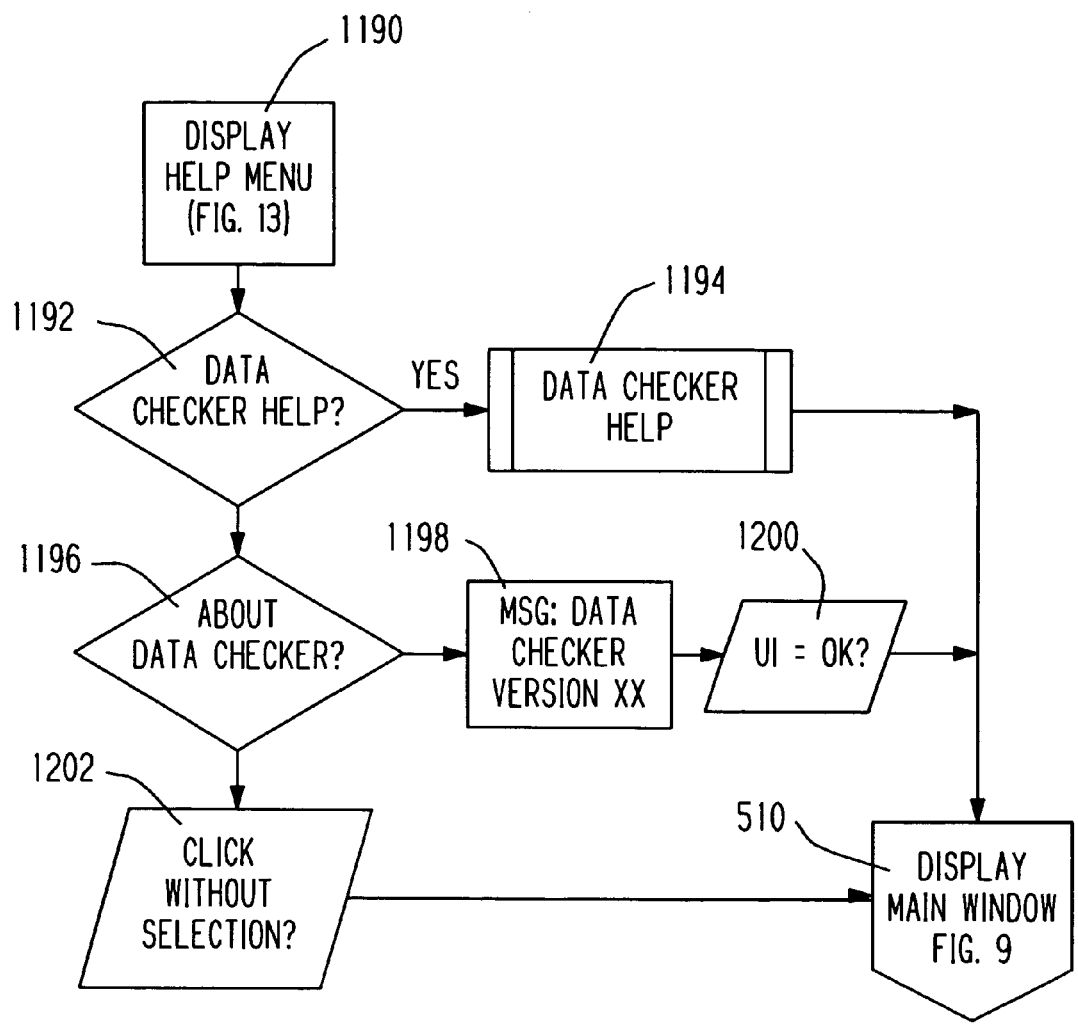
FIG. 43 is a flow diagram of a help menu procedure in the data checking program of FIG. 9.

When "help" is selected in the menu bar of the main window 394, step 462 of FIG. 9 calls the help procedure of FIG. 43. Step 1190 displays the help menu 1191 of FIG. 13 which contains the items "data checker help" and "about data checker". Selection of the item "data checker help" is sensed in step 1192 to call a conventional help procedure 1194 which includes instructions for performing the functions as described in detail in this specification. When the item "about data checker" is selected, step 1196 branches to step 1198 to display a message "data checker version xx". Step 1200 waits until an ok button (not shown) is clicked to give the user opportunity to read the message. If the user clicks without pointing to one of the menu items, step 1202 returns to the main program. Return to the main program also occurs from steps 1194 and 1200. With the return to the main program the help menu is erased.

While the above description describes in detail a data checking program for files and records in an educational management system, the data checker described in the description and accompanying drawings can be readily modified or changed to apply to other computerized data storage systems. Thus many modifications, variations and changes in detail can be made to the described data checker for an education management system in accordance with the present invention.

The invention claimed is:

1. A data checking system for determining if necessary files and data have been entered into a computerized management educational system having a data base containing a plurality of files and data, the system comprising:
   an item list defining possible data including lesson plan information in the computerized management system;
   means for displaying the list and for enabling the user to select one or more items in the item list as necessary for the management system;
   means enabling a user to request a search of the data base for the selected items; and
   means responsive to a request to search the data base for the selected items for conducting an inspection of the management system data base to determine the presence or absence of the selected items including lesson plans and for reporting the results of the conducted inspection.

2. A data checking system as defined in claim 1 wherein the item list includes child information having ethnicity and the inspection conducting means determines the presence or absence of entries of child ethnicity.

3. A data checking system for determining if necessary files and data have been entered into a computerized management system having a data base containing a plurality of files and data, the system comprising:

an item list defining possible data in the computerized management system;

means for displaying the list and for enabling the user to select one or more items in the item list as necessary for the management system;

means enabling a user to request a search of the data base for the selected items; and means responsive to a request to search the data base for the selected items for conducting an inspection of the management system data base to determine the presence or absence of the selected items and for reporting the results of the conducted inspection;

wherein the item list includes child developmental areas and the inspection conducting means determines the presence or absence of child accomplishment in the selected developmental areas.

4. A data checking system as defined in claim 3 wherein child accomplishment data is associated with set periods of time and further comprising:

means for selecting a period of time of one or more days, said inspection conducting means determining the presence of child accomplishment data associated with the selected period of time.

5. A method of determining if necessary files and data have been entered into a computerized educational management system having a data base containing a plurality of files and data, the method comprising:

displaying an item list defining possible data including lesson plan information in the computerized management system;

selecting one or more items in the displayed item list as necessary for the management system;

requesting a search of the data base for the selected items;

searching the data base in response to a search request to determine the presence or absence of the selected items including lesson plans; and reporting the results of the searching of the data base.

6. A method as defined in claim 5 wherein the item list includes child developmental areas and the checking determines the presence or absence of child accomplishment in the selected developmental areas.

7. A data checking system as defined in claim 1 wherein one of the selected items of the possible data includes a date and further comprising:

means for setting a selected period of one or more days, said inspection conducting means determining the presence of the one selected item having a date within the selected period.

8. A method as defined in claim 5 wherein one of the selected items of the possible data includes a date and further comprising the step of:

setting a selected period of one or more days, said searching including determining the presence of the one selected item having a date within the selected period.

9. A method as defined in claim 5 wherein the item list includes child information having ethnicity and the checking determines the presence or absence of entries of child ethnicity.

10. A data checking system as defined in claim 6 wherein child accomplishment data is associated with set periods of time and further comprising the step of:

selecting a period of time of one or more days, said searching including determining the presence of child accomplishment data associated with the selected period of time.

\* \* \* \* \*